US012496060B2

(12) United States Patent
Scherr et al.

(10) Patent No.: US 12,496,060 B2
(45) Date of Patent: Dec. 16, 2025

(54) TISSUE SURFACE PIERCING SYSTEM AND METHODS

(71) Applicant: Altyx Medical, Inc., Evanston, IA (US)

(72) Inventors: Douglas Scherr, Scarsdale, NY (US); Roger Goldberg, Evanston, IL (US); Ghazaleh Rostami Nia, Chicago, IL (US)

(73) Assignee: ALTYX MEDICAL, INC., Evanston, IL (US)

( * ) Notice: Subject to any disclaimer, the term of this patent is extended or adjusted under 35 U.S.C. 154(b) by 719 days.

(21) Appl. No.: 17/802,483

(22) PCT Filed: Feb. 27, 2021

(86) PCT No.: PCT/US2021/020129
§ 371 (c)(1),
(2) Date: Aug. 25, 2022

(87) PCT Pub. No.: WO2021/174148
PCT Pub. Date: Sep. 2, 2021

(65) Prior Publication Data
US 2023/0104807 A1 Apr. 6, 2023

Related U.S. Application Data

(60) Provisional application No. 62/982,440, filed on Feb. 27, 2020.

(51) Int. Cl.
*A61B 17/04* (2006.01)
*A61B 17/00* (2006.01)
(Continued)

(52) U.S. Cl.
CPC ...... *A61B 17/0482* (2013.01); *A61B 17/0493* (2013.01); *A61B 2017/00367* (2013.01);
(Continued)

(58) Field of Classification Search
CPC ................ A61B 17/0482; A61B 2017/3405
See application file for complete search history.

(56) References Cited

U.S. PATENT DOCUMENTS 3,123,077 A    3/1964  Alcamo
4,841,888 A *  6/1989  Mills ............... A61B 17/068
                                       112/DIG. 2
(Continued)

FOREIGN PATENT DOCUMENTS

EP   1908424 A1   4/2008
EP   2149338 A1   2/2010
(Continued)

OTHER PUBLICATIONS

Examination Report mailed May 1, 2025 in Canadian Patent Application No. 3173298, 5 pages.
(Continued)

*Primary Examiner* — Phong Son H Dang
(74) *Attorney, Agent, or Firm* — Perkins Coie LLP

(57) ABSTRACT

A system, including a needle guide defining a path of travel of a needle inserted through the guide, and a tissue manipulator configured to approximate tissue and said needle guide and to position at least a portion of the tissue in the path of travel of the needle, and wherein the tissue manipulator and the needle guide are alignable such that the path of travel crosses a same surface of the tissue a plurality of times.

18 Claims, 16 Drawing Sheets

(51) Int. Cl.
*A61B 17/06* (2006.01)
*A61B 17/30* (2006.01)
*A61B 17/34* (2006.01)
*A61B 90/00* (2016.01)

(52) U.S. Cl.
CPC ............ *A61B 2017/00818* (2013.01); *A61B 2017/00876* (2013.01); *A61B 2017/0464* (2013.01); *A61B 17/06* (2013.01); *A61B 2017/306* (2013.01); *A61B 2017/3405* (2013.01); *A61B 2017/3452* (2013.01); *A61B 2017/3484* (2013.01); *A61B 2090/3945* (2016.02)

(56) References Cited

U.S. PATENT DOCUMENTS

| | | | | |
|---|---|---|---|---|
| 5,336,229 | A * | 8/1994 | Noda | A61B 17/12013 606/139 |
| 5,411,481 | A * | 5/1995 | Allen | A61B 17/0469 606/208 |
| 5,792,153 | A * | 8/1998 | Swain | A61B 17/0469 606/139 |
| 6,533,796 | B1 * | 3/2003 | Sauer | A61B 17/0482 606/144 |
| 6,551,330 | B1 * | 4/2003 | Bain | A61B 17/0469 606/144 |
| 7,063,710 | B2 * | 6/2006 | Takamoto | A61B 17/0469 606/139 |
| 7,063,715 | B2 | 6/2006 | Onuki et al. | |
| 7,704,261 | B2 * | 4/2010 | Sakamoto | A61B 17/0469 606/139 |
| 7,736,378 | B2 | 6/2010 | Maahs et al. | |
| 7,951,158 | B2 | 5/2011 | Ewers et al. | |
| 7,976,554 | B2 | 7/2011 | Newell et al. | |
| 8,057,386 | B2 | 11/2011 | Aznoian et al. | |
| 8,128,642 | B2 * | 3/2012 | Heeps | A61B 17/064 606/151 |
| 8,267,947 | B2 * | 9/2012 | Pantages | A61B 17/0487 606/144 |
| 8,388,653 | B2 | 3/2013 | Nobis et al. | |
| 8,863,748 | B2 | 10/2014 | Kuroda et al. | |
| 8,944,990 | B2 | 2/2015 | Hamel et al. | |
| 9,044,220 | B2 | 6/2015 | Chu | |
| 9,386,980 | B2 * | 7/2016 | Smith | A61B 17/0491 |
| 9,408,602 | B2 | 8/2016 | Chu | |
| 9,833,228 | B2 | 12/2017 | Theobald | |
| 10,299,828 | B2 | 5/2019 | Goldberg et al. | |
| 10,357,284 | B2 | 7/2019 | Mujwid et al. | |
| 10,398,431 | B2 | 9/2019 | Mujwid et al. | |
| 10,456,230 | B2 | 10/2019 | Schuchardt et al. | |
| 10,548,590 | B2 | 2/2020 | Harris et al. | |
| 10,799,235 | B2 | 10/2020 | Teague et al. | |
| 11,534,156 | B2 * | 12/2022 | Speziali | A61B 17/0482 |
| 11,648,003 | B2 * | 5/2023 | Heneveld | A61B 17/3421 606/147 |
| 2003/0216613 | A1 | 11/2003 | Suzuki et al. | |
| 2003/0233108 | A1 | 12/2003 | Gellman et al. | |
| 2004/0015177 | A1 * | 1/2004 | Chu | A61B 17/0469 606/139 |
| 2004/0138682 | A1 | 7/2004 | Onuki et al. | |
| 2005/0251153 | A1 | 11/2005 | Sakamoto et al. | |
| 2006/0265042 | A1 | 11/2006 | Catanese, III et al. | |
| 2007/0032799 | A1 * | 2/2007 | Pantages | A61B 17/0487 606/144 |
| 2009/0222027 | A1 * | 9/2009 | Sauer | A61B 17/06061 606/144 |
| 2010/0211086 | A1 | 8/2010 | Ewers et al. | |
| 2010/0331623 | A1 * | 12/2010 | Sauer | A61B 1/0014 606/139 |
| 2012/0101522 | A1 | 4/2012 | Megaro et al. | |
| 2014/0088621 | A1 | 3/2014 | Krieger et al. | |
| 2014/0180313 | A1 * | 6/2014 | Harrison | A61B 17/0469 606/148 |
| 2018/0035996 | A1 | 2/2018 | Goss | |
| 2018/0228487 | A1 | 8/2018 | Smith | |
| 2019/0298344 | A1 | 10/2019 | Mujwid et al. | |
| 2022/0304673 | A1 | 9/2022 | Scherr et al. | |

FOREIGN PATENT DOCUMENTS

| | | |
|---|---|---|
| JP | S5252389 | 4/1977 |
| JP | 200424618 A1 | 1/2004 |
| WO | 9525468 A1 | 9/1995 |
| WO | WO2008069816 | 6/2008 |
| WO | 2010085793 A2 | 7/2010 |

OTHER PUBLICATIONS

Office Action mailed May 30, 2025 in Japanese Patent Application No. 2022-551719, 6 pages, English translation.

International Search Report and Written Opinion mailed Jul. 14, 2021 in International Patent Application No. PCT/US21/20129, 16 pages.

Examination Report mailed Mar. 27, 2024 in Canadian Patent Application No. 3173298, 7 pages.

Extended European Search Report mailed Mar. 12, 2025 in European Patent Application No. 22764029.9, 11 pages.

Extended European Search Report mailed Feb. 13, 2024 in European Patent Application No. 21761831.3, 11 pages.

Office Action mailed Oct. 8, 2024 in Japanese Patent Application No. 2022-551719, 18 pages, English translation.

Partial Supplementary European Search Report mailed Dec. 19, 2024 in European Patent Application No. 22764029.9, 12 pages.

International Search Report and Written Opinion mailed Jul. 26, 2022 in International Patent Application No. PCT/US22/18653, 15 pages.

* cited by examiner

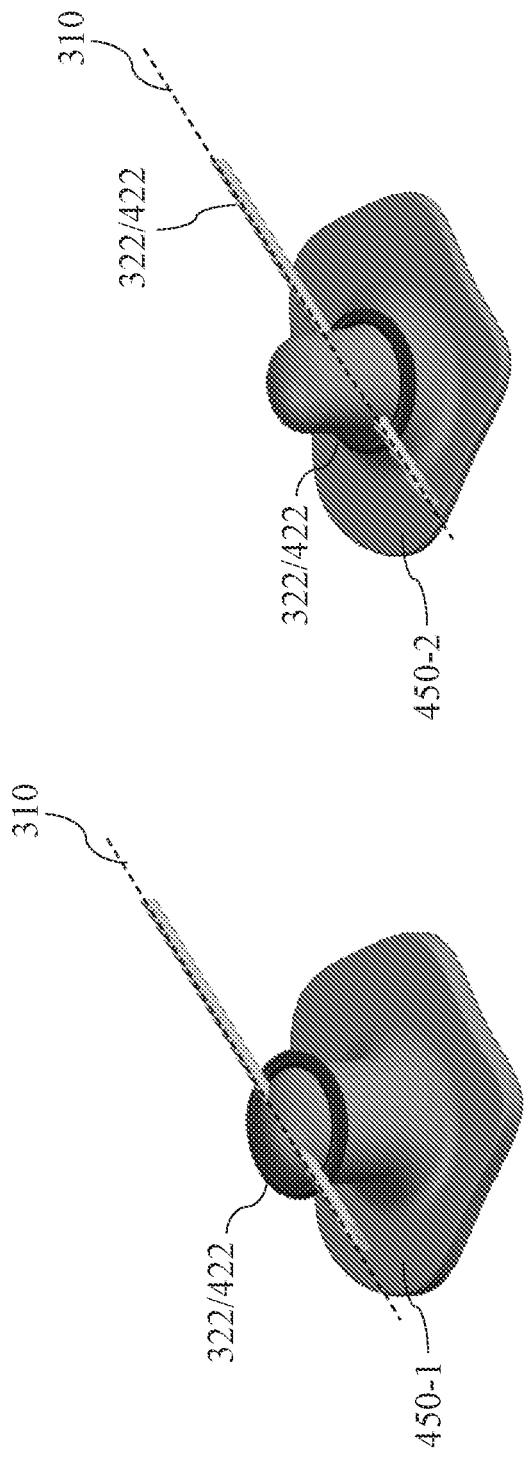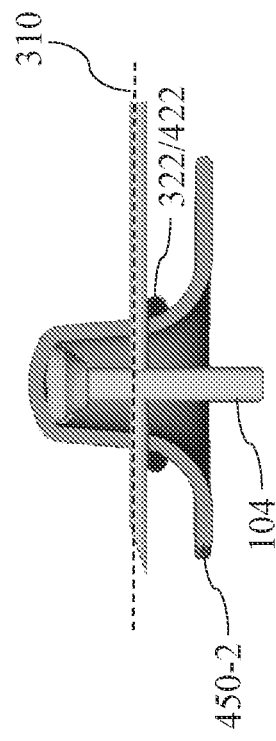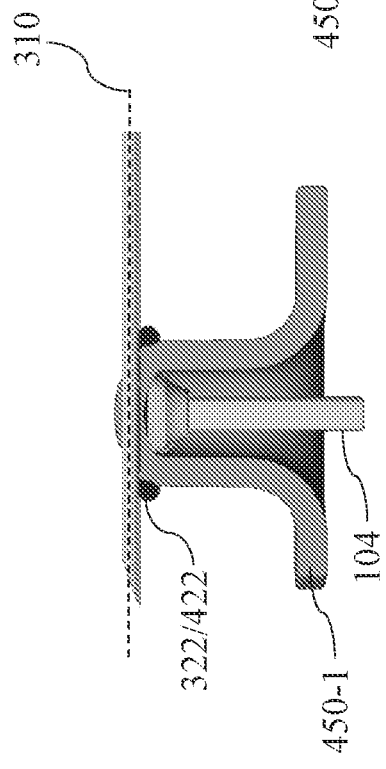
FIG. 4A
FIG. 4B
FIG. 4C
FIG. 4D

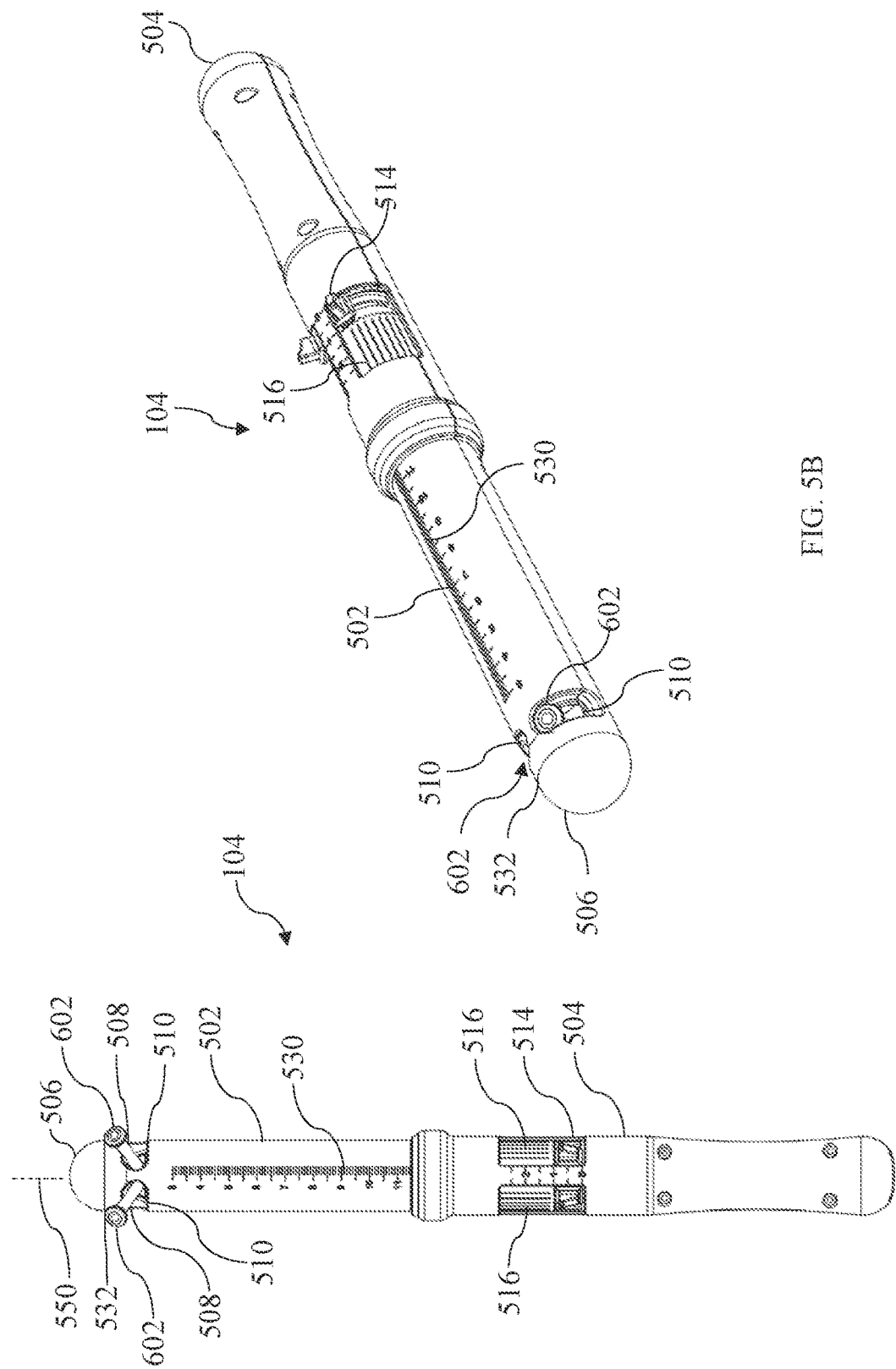

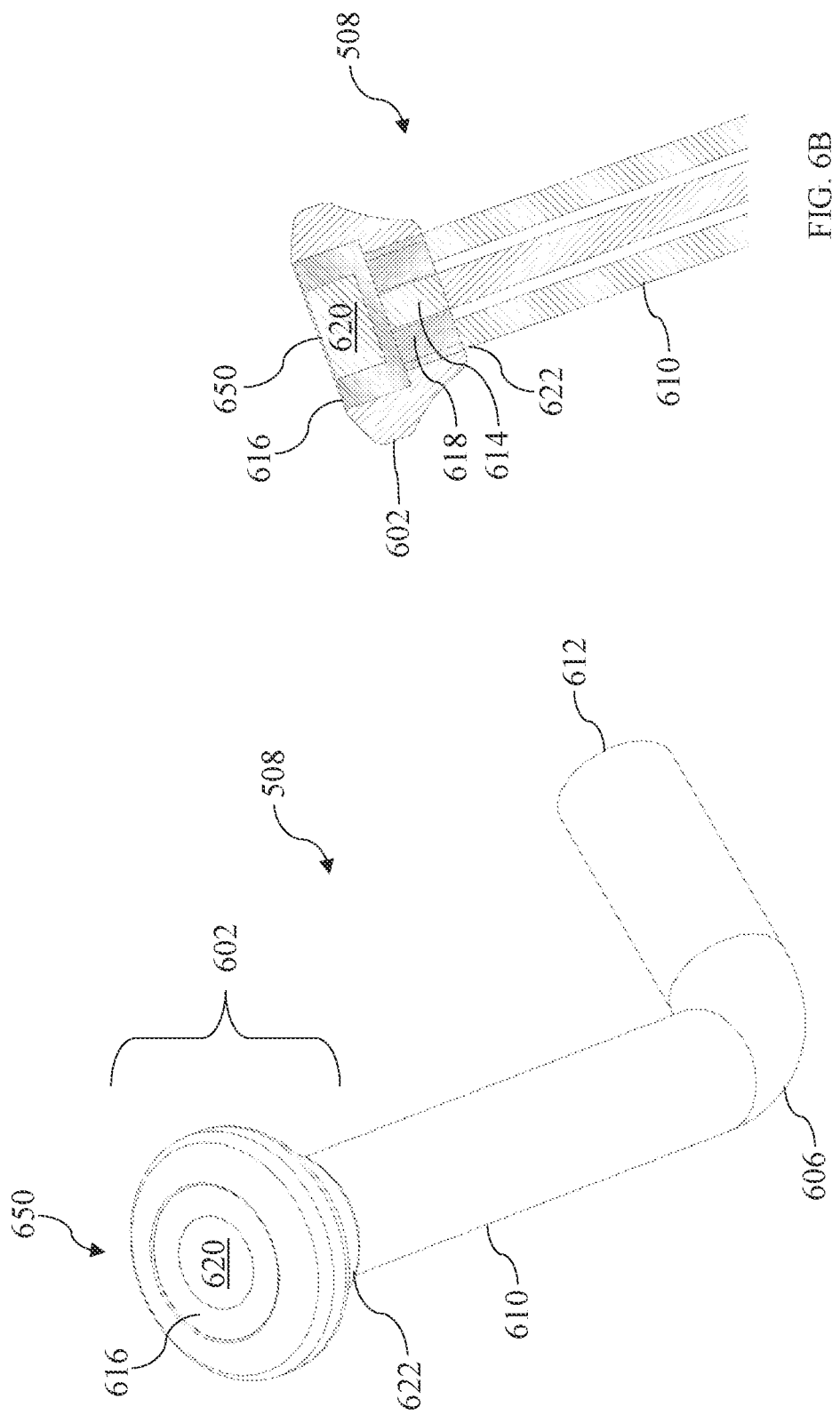

TISSUE SURFACE PIERCING SYSTEM AND METHODS

CROSS-REFERENCE TO RELATED APPLICATIONS

This application is a U.S. national stage application of International Patent Application No. PCT/US21/20129, filed Feb. 27, 2021, which claims the benefit of U.S. Provisional Patent Application No. 62/982,440, filed Feb. 27, 2020, which are both incorporated by reference herein in their entireties.

TECHNICAL FIELD

The present technology generally relates to the field of tissue fixing and/or securing (e.g., tissue-pexy) systems and associated methods.

BACKGROUND

Needles used for piercing tissue e.g., for introducing a device or substance into tissue, are often positioned along the tissue using a needle guide. In some cases, the needle guide is a tube which comprises an opening at the end thereof and is used to direct the needle into the opening. In some embodiments, the opening of the needle guide is positioned proximal to a tissue such that a needle traveling through the guide pierces the tissue.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

FIGS. 4A, 4B, 4C, 4D, 4E, and 4F are perspective views and corresponding cross-sectional views of height variations of the path of travel corresponding to tissue thickness in accordance with some embodiments of the present technology.

FIGS. 5A, 5B, and 5C are perspective views of a tissue manipulator configured in accordance with some embodiments of the present technology.

FIGS. 6A and 6B are a perspective view and a cross-sectional view, respectively, of a probe configured in accordance with embodiments of the present technology.

DETAILED DESCRIPTION

Figure 1A:
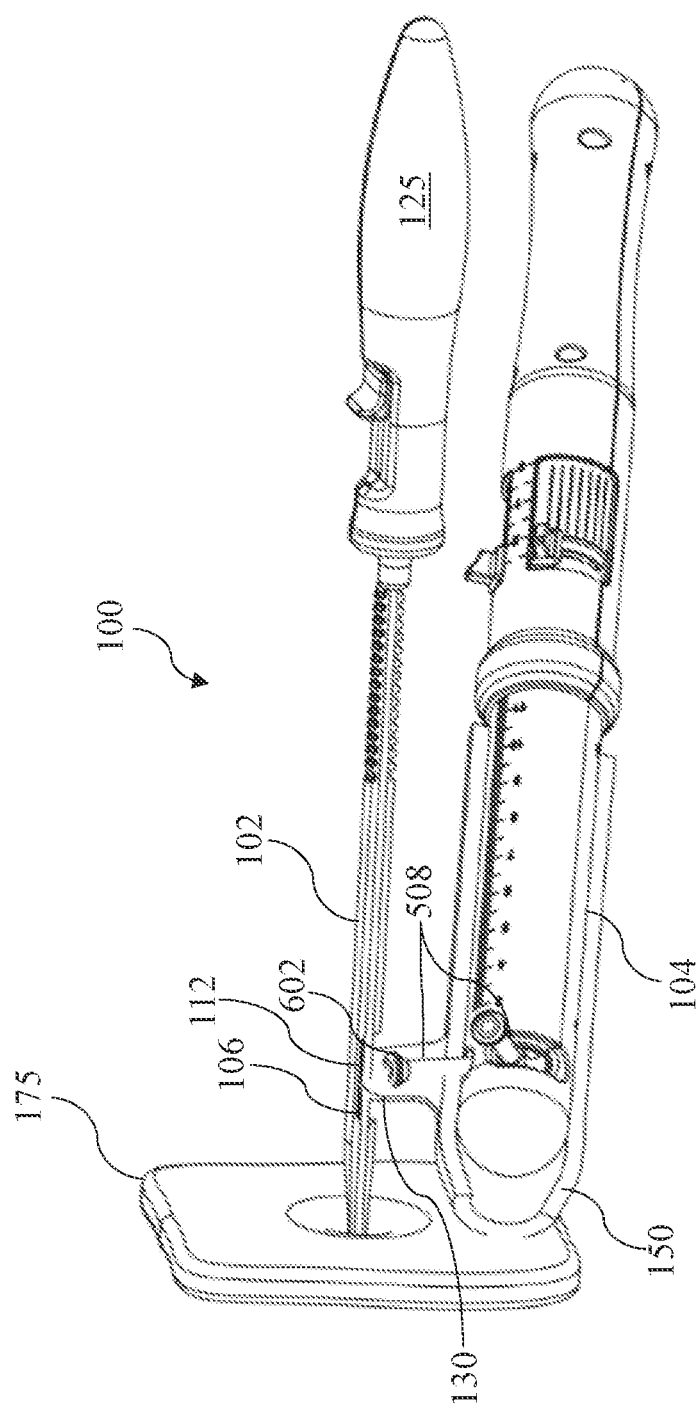
FIG. 1A is a perspective view of a tissue-pexy system configured in accordance with embodiments of the present technology.

The present technology is directed to tissue-pexy systems, devices and methods for treating anatomical disorders. In some embodiments, the tissue-pexy system can include a needle guide and a tissue manipulator. The needle guide can include an elongated structure or frame extending between a first end portion and a second end portion. The elongated structure has a path or lumen extending axially therethrough for receiving a needle and extending between the first end portion and the second end portion. The needle guide further includes a cavity, cut-out, or recess in the elongated structure positioned between the first end portion and the second end portion. The cavity bisects a longitudinal axis of the lumen such that, as a needle is advanced through the lumen, the needle travels through a portion of the cavity. The tissue manipulator can include an elongated body configured for placement within a hollow organ or other body lumen (e.g., a rectum). The tissue manipulator further includes one or more deployable probes or extension features that can be deployed from the outer body portion to contact and direct tissue of the hollow organ or other body lumen in a particular direction or orientation.

In operation, the needle guide can be positioned adjacent but external to the hollow organ or other body lumen, while the tissue manipulator can be positioned within the hollow organ or other body lumen. The needle guide and tissue manipulator can be positioned relative to one another such that the cavity of the needle guide aligns with a deployment path of a probe on the tissue manipulator. Once aligned, the probe can be deployed from the tissue manipulator to direct a portion of patient tissue (e.g., a wall of the hollow organ) into the cavity of the needle guide (e.g., the portion of patient tissue is "pinched" between the probe and an inner surface of the cavity). A needle connected to a suture can then be advanced through the lumen of the needle guide. As the needle is advanced, it traverses the cavity and therefore pierces the portion of tissue positioned within the cavity. The needle can be further advanced to pierce a second tissue different than the first tissue, and the suture can be used to secure the first tissue to the second tissue. Of note, in at least some embodiments the foregoing procedure can be used to suture tissue of a hollow organ or other lumen to another tissue without penetrating an interior surface of the hollow organ or other lumen, and therefore without creating a potential leak from the hollow organ or other lumen. Accordingly, one expected advantage of the present technology is the ability to perform tissue-pexy procedures (e.g., rectopexy) without affecting the integrity of the target organ.

In some embodiments, for example, a tissue-pexy system comprises a needle guide defining a path of travel of a needle inserted through the needle guide. The tissue-pexy system is configured to attach a plurality of tissues to each other. In some embodiments, at least one of the tissues to be attached is at least a portion of a hollow organ e.g., a hollow organ wall. The tissue-pexy system is configured to attach a hollow organ to another tissue without disturbing the integrity of the lumen of the hollow organ.

In some embodiments, the system comprises a tissue manipulator configured to approximate tissue and the needle guide such that at least a portion of tissue positioned between the tissue manipulator and the needle is placed in the path of travel of the needle. The tissue manipulator and the needle guide are alignable such that the tissue placed in the path of travel of the needle is oriented in relation to the needle guide such that the path of travel crosses a same surface of the tissue a plurality of times without traversing the full thickness of the tissue.

In some embodiments, and as explained in greater detail elsewhere herein, the needle guide comprises one or more cavities along the longitudinal axis of the needle guide. The tissue manipulator is configured to approximate the needle guide and/or a cavity. In some embodiments, during implementation of the system, the tissue manipulator is configured to approximate the needle guide and/or the one or more cavities such that a tissue is trapped between the tissue manipulator and the needle guide.

In some embodiments, the needle guide comprises a self-held mechanism configured to set onto the tissue manipulator such that a layer of tissue positioned therebetween remains intact. In some embodiments, the needle guide comprises a self-held mechanism which independently maintains a spatial orientation of the needle guide fixed in relation to the tissue manipulator, e.g., without user intervention.

In some embodiments, the one or more cavities is configured to accommodate at least a portion of the tissue manipulator. In some embodiments, the tissue manipulator comprises one or more probes that extend from a body portion of the tissue manipulator to approximate tissue and the needle guide and/or the one or more cavities of the needle guide.

In some embodiments, the path of travel of the needle crosses the tissue trapped between the tissue manipulator probe and the needle guide. In some embodiments, the geometry of at least one needle guide and the tissue manipulator is such that the path of travel of a needle inserted along the needle guide crosses a same surface of the tissue a plurality of times without traversing full thickness of the tissue.

Further embodiments of the present technology are directed to methods for performing rectopexy for treating rectal disorders, e.g., rectal prolapse. Such methods may comprise, for example, performing a rectal examination and identifying a site of excessive/abnormal rectal mobility, identifying approximation of the identified site of excessive/ abnormal rectal mobility of the rectum and/or para-rectal tissues to the sacrospinous ligament, introducing an anchor and a suture intra-abdominally and extra-rectally and passing the anchor and suture through at least a portion of the exterior rectal wall, followed by: guiding the anchor and suture into the sacrospinous ligament and anchoring the anchor and suture at least partially in the sacrospinous ligament.

In some embodiments, the identifying a site of excessive/ abnormal rectal mobility is carried out by palpation, visually or via imaging (e.g., ultrasound). In some embodiments, passing the anchor and suture through at least a portion of the exterior rectal wall comprises passing the anchor and suture a plurality of times only through the external surface of the rectum. In some embodiments, passing the anchor and suture through at least a portion of the exterior rectal wall without traversing full thickness of the rectal wall. In some embodiments, passing the anchor and suture through at least a portion of the exterior rectal wall without breaching the integrity of the rectal lumen.

According to an aspect of some embodiments of the present technology there is provided a method for piercing a segment of tissue e.g., a tissue wall, without traversing a full thickness of the wall. In some embodiments, the method comprises positioning a tissue wall between a tissue manipulator and a needle guide. In some embodiments, the method comprises positioning a needle guide along a first side of a tissue and positioning a tissue manipulator along a second side of the tissue. In some embodiments, the method comprises approximating the tissue manipulator to the needle guide such that at least a portion of the tissue is placed in a path of travel of the needle. In some embodiments, the method comprises driving a needle through the tissue, such that the needle crosses a same surface of the tissue a plurality of times without traversing the full thickness of the tissue.

One expected advantage of the systems and methods described herein is that the path of travel of the needle is prevented from crossing more than one surface of the tissue, i.e., full thickness of the tissue is in that the tissue manipulator the system can be employed for suturing hollow organ walls e.g., repairing tears or openings as well as suturing walls of hollow organs to other tissue (e.g., tissue-pexy) without penetrating the tissue lumen.

For example, in some embodiments the system is implemented in rectopexy procedures wherein the tissue manipulator is inserted into a rectum of a subject and the needle is inserted inter-abdominally.

A potential advantage of the path of travel of the needle not crossing into a tissue lumen is in that the system allows threading a tissue wall of a hollow organ (e.g., urinary bladder or digestive tract wall) without penetrating the lumen. For example, in rectopexy procedures, the rectal lumen is maintained intact. In other words, the rectal lumen remains unpenetrated by the needle. Therefore, during implementation of the system in a rectopexy procedure, the path of travel of the needle crosses the rectal tissue wall while not penetrating the rectal lumen and breaking sterility.

The terminology used in the description presented below is intended to be interpreted in its broadest reasonable manner, even though it is being used in conjunction with a detailed description of certain specific embodiments of the present technology. Certain terms may even be emphasized below; however, any terminology intended to be interpreted in any restricted manner will be overtly and specifically defined as such in this Detailed Description section. Additionally, the present technology can include other embodiments that are within the scope of the examples but that are not described in detail with respect to FIGS. 1A-9B.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "generally," "approximately," and "about" are used herein to mean the stated value plus or minus 10%.

The headings provided herein are for convenience only and do not interpret the scope or meaning of the claimed present technology.

Tissue-Pexy Systems and Implementation

Figure 1B:
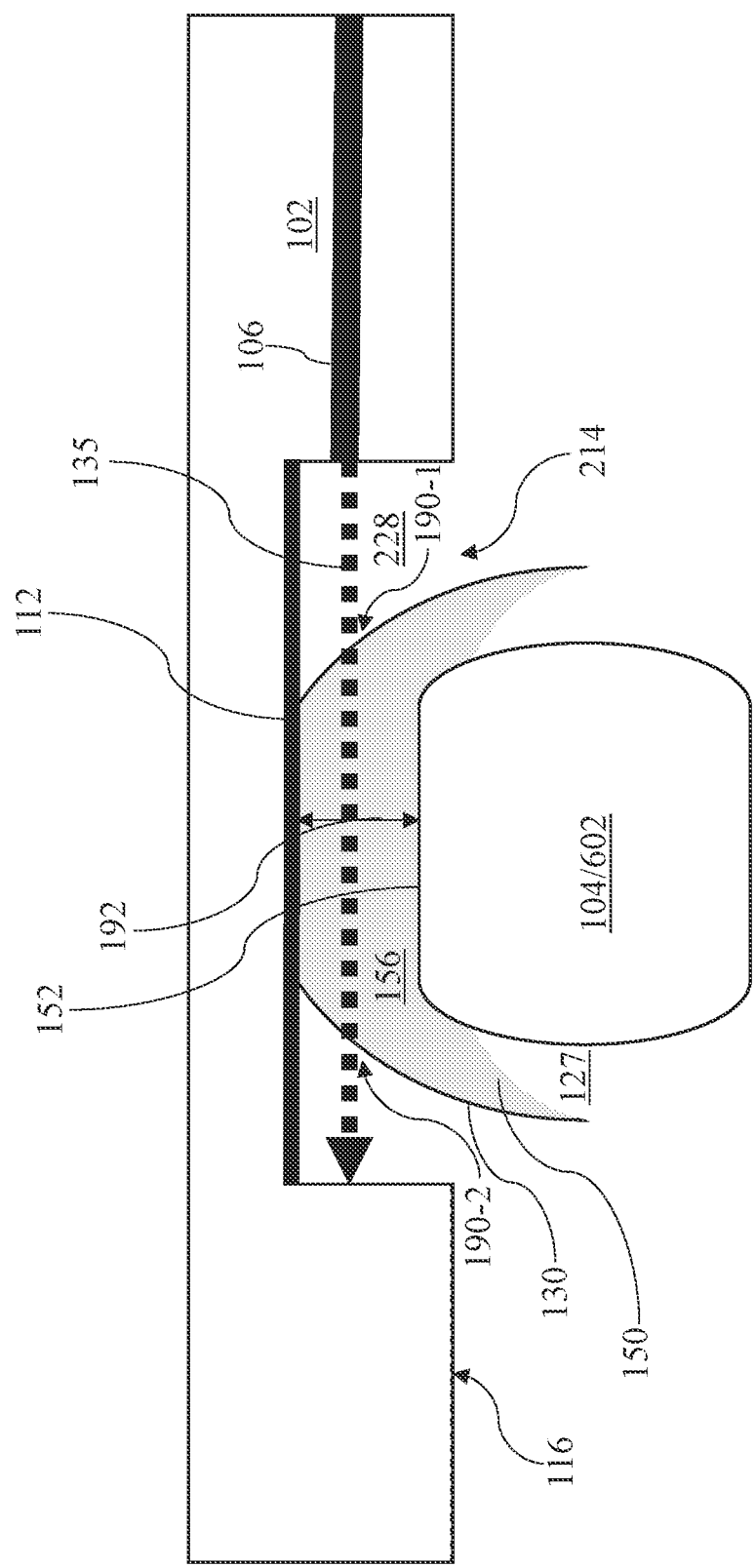
FIG. 1B is a partially schematic cross-sectional view of the tissue-pexy system of FIG. 1A.

FIG. 1A is a perspective view of a tissue-pexy system 100 configured in accordance with embodiments of the present technology, and FIG. 1B is a cross-sectional view of the tissue-pexy system of FIG. 1A. Referring to FIGS. 1A and 1B together, the system 100 comprises a needle guide 102 and a tissue manipulator 104. In some embodiments, the system 100 is configured to thread a portion of a first tissue 150 with a needle 106 directed by the needle guide 102. In some embodiments, and as described in greater detail elsewhere herein, the needle guide 102 is configured to be coupled and/or anchored to a second tissue 175. In some embodiments, and as described in greater detail elsewhere herein, when coupled and/or anchored, the needle guide 102 is maintained in a stationary state relative to the second tissue 175. The system 100 allows coupling of the first tissue 150 to the second tissue 175 without penetrating the lumen of the first tissue 150.

The needle 106 runs along and/or inside a lumen of needle guide 102 along a path of travel 135, traverses at least a portion of a cavity 214 (FIG. 2—described further below) in needle guide 102, and through a second opening 204 (FIG. 2) at a tip of needle guide 102 thus exiting needle guide 102. Hence, in operation, needle guide opening 204 is placed abutting a surface of second tissue 175 and at least a portion of a first tissue 150 is urged into cavity 214 and, for example, against an inner wall 112 of needle guide 102. A needle 106 driven through needle guide 102 penetrates first tissue 150, exits needle guide second opening 204 and penetrates second tissue 175 thus coupling at least a portion of the first tissue 150 with the second tissue 175. In some embodiments, the needle 106 is configured to guide a suture through the first tissue 150 and/or the second tissue 175. In some embodiments, the suture is released from the needle guide 102 through a slot 116 between the second opening 204 and one or more cavity 214.

In some embodiments, the needle 106 comprises a coupling member e.g., an anchor and/or a thread that anchors first tissue 150 to second tissue 175. In some embodiments, needle guide 102 comprises a handle 125.

In some embodiments, the tissue manipulator 104 is configured for insertion into and within an organ lumen, for example, a rectum of a subject. In some embodiments, the tissue manipulator 104 is positioned in relation to the needle guide 102 such that the first tissue 150 forms a barrier between the tissue manipulator 104 and the needle guide 102. In some embodiments, the tissue manipulator 104 is configured to draw a portion of the first tissue 150 towards the needle guide 102. For example, in some embodiments, and as described in greater detail elsewhere herein, the tissue manipulator 104 comprises one or more probes 508 configured to trap a portion of the first tissue 150 between the tissue manipulator 104 and the needle guide 102.

In some embodiments, the one or more probes 508 (described in greater detail below with reference to FIGS. 5A-5C) are configured to approximate the tissue and needle guide 102 while maintaining a thickness of the first tissue 150 between a probe tip 602 and the needle guide 102. In some embodiments, the one or more probes 508 are insertable into one or more cavities 214 in the needle guide 102.

In some embodiments, the approximation of the one or more probes 508 and the cavity 214 and/or inner wall 112 is automatic. For example, in some embodiments, the cavity 214 and/or inner wall 112 and one or more probes 508 comprise attracting magnets configured to trap a thickness of the first tissue 150 along at least a portion of the path of travel 135. In some embodiments, the needle guide 102 comprises a suction mechanism configured to position a thickness of the first tissue 150 along at least a portion of the path of travel 135.

In some embodiments, the cavity 214 and/or the needle guide 102 comprises a suction port and the needle guide 102 is configured to facilitate drawing of the tissue, e.g., a lumen wall, into the cavity 214 by application of suction through the suction port. Reference is made to FIG. 1B, which is a cross-section view simplified illustration of a system, in accordance with some embodiments of the present technology. In some embodiments, the tissue manipulator 104 is configured to introduce a tissue (for example, the first tissue 150) into one or more cavity 214 of the needle guide 102 to approximate a portion of tissue and an inner wall 112 of the needle guide 102 such that the tissue (for example, at least a portion of the first tissue 150) is trapped between the inner wall 112 and the tissue manipulator 104 and urged against inner wall 112.

For example, in some embodiments, the system 100 is implemented by inserting the tissue manipulator 104 into an organ lumen 127 and positioning the needle guide 102 proximal to the outer surface 130 of the organ lumen 127.

In some embodiments, and as described in greater detail elsewhere herein, the needle guide 102 comprises a cavity 214 configured to accommodate at least a portion of the tissue manipulator 104 and/or a tissue layer or thickness and/or a tissue mass.

In some embodiments, the tissue manipulator 104 is configured to approximate the tissue and the needle guide 102 such that a tissue portion 156 of the first tissue 150 is urged by the tissue manipulator 104 towards the needle guide 102 and into cavity 214.

In some embodiments, the tissue portion 156 forms a barrier between the tissue manipulator 104 and the needle guide 102. In some embodiments, a geometry of tissue contacting surface 152 of probe head 602 conforms to the geometry of inner wall 112 (e.g., complementary geometries) such that when a portion of first tissue 150 is trapped between surface 152 of probe head 602 and inner wall 112, only a thickness of first tissue 150 is placed in the path of travel 135 of needle 106. In some embodiments, the path of travel 135 is configured to cross a same surface of tissue portion 156 a plurality of times. In some embodiments, the path of travel 135 is configured to cross the outer surface 130 of tissue portion 156 a plurality of times without penetrating or entering the organ lumen 127.

In some embodiments, the geometries of one or more of the tissue manipulators 104, the cavity 214, and the inner wall 112 are complementary. In some embodiments, the geometries of the tissue manipulator 104, the cavity 214, and the inner wall 112 are configured to maintain a tissue layer in a fixed position in relation to the path of travel 135. For example, and as described in greater detail herein, in some embodiments the inner wall 112 is generally but not necessarily parallel to the path of travel 135.

A potential advantage in this configuration is in that needle 106 following path of travel 135 enters first tissue 150 portion 156 at an entry point 190-1, travels through first tissue 150 and exits via exit point 190-2 without traversing a full thickness of first tissue 150. In some embodiments, first tissue 150 comprises a wall of a hollow organ, in which case needle 106 travelling along path of travel 135 does not traverse the full thickness 192 of the wall of the hollow organ (first tissue 150) and does not breach the integrity of the lumen of the hollow organ. In cases in which contents of the hollow organ are non-sterile e.g., rectum, maintaining the integrity of the lumen of the hollow organ maintains sterility of the surgical site.

In some embodiments, at least one of the needle guide 102 and the tissue manipulator 104 comprise one or more sensors for indicating an alignment of the tissue manipulator 104 with the needle guide 102. In some embodiments, the one or more sensor comprise one or more of a proximity sensor, an optical sensor, a pressure sensor, and the like. In some embodiments, the one or more sensors are positioned along the needle guide 102 and/or the tissue manipulator 104. In some embodiments, the one or more sensors indicate to a user of a correct alignment of at least a specific portion of the tissue manipulator 104 with the cavity 214. In some embodiments, the tissue manipulator 104 and the needle guide 102 comprise attracting magnets configured to align at least a specific portion of the tissue manipulator 104 with the cavity 214.

Needle Guide(s)

Figure 2:
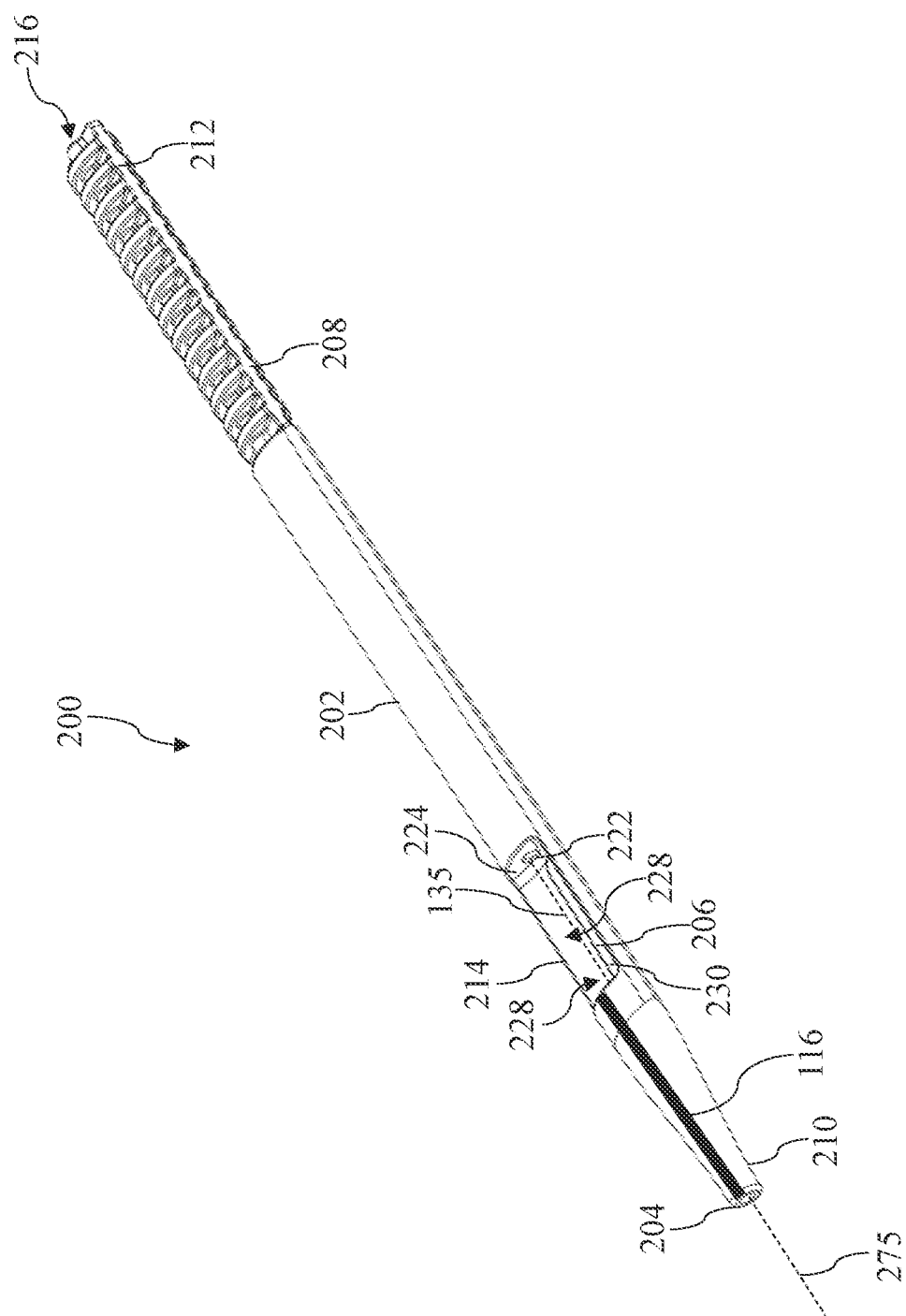
FIG. 2 is a perspective view of a needle guide configured in accordance with embodiments of the present technology.

FIG. 2 is a perspective view of a needle guide 200 configured in accordance with embodiments of the present technology. In some embodiments, the needle guide 200 can be the same or substantially the same as the needle guide 102 of the system 100 (FIGS. 1A and 1B), and therefore may be referred to as "the needle guide 102", "the needle guide 200" or "the needle guide 102/200". In operation, the needle guide 102 is used to direct a needle inserted therethrough. For example, the needle guide 102 encloses at least a portion of a needle inserted therethrough. In some embodiments, the needle guide 102 includes a needle guide body 202 having a tube or a channel that defines a path of travel of a needle 106 inserted into the needle guide 102.

In some embodiments, the needle guide 102 and/or the needle guide body 202 is configured to accommodate at least a portion of one or more tissues. For example, in some embodiments, at least a portion of the needle guide 102 comprises a concave and/or a convex portion or recess. In some embodiments, the path of travel 135 is coaxial with the needle guide 102.

In some embodiments, the diameter of a cross section of the needle guide body 202 varies. For example, in some embodiments, a portion of the needle guide body 202 is tapered.

In some embodiments, the needle guide body 202 comprises a first end 212 configured to receive a needle and a second opposite end 210 comprising a second opening 204 configured to guide the needle 106 out of the needle guide 102. In some embodiments, the needle guide 102/200 comprises a first end 212 and a second end 210 positioned such that for example, the first end 212 comprises the first opening 216 and the second end 210 comprises the second opening 204.

In some embodiments and as disclosed elsewhere herein, the needle guide 102 comprises one or more cavities 214 configured to accommodate a portion of a tissue and/or a probe. In some embodiments the one or more cavities 214 comprises one or more openings within the needle guide body 202. In some embodiments, the one or more cavities 214 are sized and/or configured to expose at least portion of the path of travel 135 within the needle guide 102.

In some embodiments, the exposure of the path of travel 135 through the one or more cavities 214 ensures that a tissue approximating the needle guide 200 can be positioned within one or more of the cavities 214 such that the path of travel 135 traverses a portion of the tissue. In some embodiments, the cavity 214 is configured to accommodate a tissue of a subject. In some embodiments, a tissue of a subject is positioned along the path of travel 135 within the cavity 214. In some embodiments, and as described in greater detail elsewhere herein, the tissue is trapped within the cavity 214 and between the needle guide 102/200 and a tissue manipulator.

In some embodiments, the cavity 214 is configured to expose at least a portion of an inner wall 112/206 of the needle guide 102. In some embodiments, the needle guide body 202 comprises the inner wall 112/206 and a lumen 228. In some embodiments, the lumen 228 comprises the path of travel 135. In some embodiments, the needle guide 102 comprises one or more cavities 214 that are configured to expose at least a portion of the needle guide body 202 lumen 228. In some embodiments, the path of travel 135 is directed along the longitudinal axis of the lumen 228.

In some embodiments, the one or more cavities 214 are defined by one or more traverse walls 224. In some embodiments, the one or more transverse walls 224 are configured to isolate the exposed portions of the lumen 228 (e.g., the one or more cavities 214) from the non-exposed portions of the lumen 228 positioned within the needle guide body 202. In some embodiments, the one or more traverse walls 224 are perpendicular to the path of travel. In some embodiments, the one or more traverse walls 224 are permeable by a needle. In some embodiments, the one or more traverse walls 224 are composed of a material that is pierceable by a needle such that a needle inserted along the needle guide 102 crosses one or more traverse walls 224.

In some embodiments, the one or more transverse walls 224 comprises one or more openings 222 configured to direct the path of travel 135. In some embodiments, the one or more openings 222 are sized to fit a needle. In some embodiments, the one or more openings 222 are positioned along the one or more transverse walls 224 as to accept a needle traveling along the path of travel 135.

In some embodiments, a first opening 216 of the first end 212 is configured to direct a needle into the needle guide 102 lumen 228. In some embodiments, a second opening 204 of the second end 210 is configured to direct a needle exiting the needle guide 102. In some embodiments, the second opening 204 is configured to direct an exit path 275 of needle in a predetermined angle in relation to the path of travel 135.

In some embodiments, the needle guide 102 comprises one or more slots 116 configured to release a suture guided by the needle 106 from the needle guide 102 lumen 228. In some embodiments, the slot 116 extends between one or more of the first opening 216 and the second opening 204 and one or more cavity 214. In some embodiments, the slot 116 extends through a thickness of a wall of the needle guide body 202. In some embodiments, the slot 116 extends along the needle guide substantially but not necessarily parallel to the path of travel 135 such that a suture that is guided by the needle 106 is releasable from needle guide 102 lumen 228 through the slot 116 during and/or after retraction of the needle 106. In some embodiments, the width of the slot 116 is sized to accommodate a suture released from the needle 106.

In some embodiments, the needle guide 102 comprises a magnetic portion 230. In some embodiments, the inner wall 112/206 comprises a magnetic portion 230 configured to attract to a magnet on the tissue manipulator 104. In some embodiments, the magnetic portion 230 is positioned along and/or behind the inner wall 112/206. In some embodiments, the magnetic portion 230 is located around the path of travel 135. For example, in some embodiments, the needle guide 102 comprises a plurality of magnetic portions 230 positioned along the sides of the path of travel 135.

In some embodiments, the needle guide 102/200 is configured to be held by a user. For example, in some embodiments, the needle guide body 202 comprises a ribbed portion 208 configured to increase traction between the needle guide and a user. In some embodiments, the ribbed portion 208 is positioned proximal to the first end 212 of the needle guide 102.

In some embodiments, the needle guide body 202 is anchorable to a tissue of a subject such that the tissue is positioned along the exit path 275. For example, in some embodiments, the needle guide 102 comprises a piercing tip positioned proximal to the second opening 204. In some embodiments, the needle guide 102 is configured to be coupled to a tissue of a subject such that the second opening 204 is at least partially covered by the tissue (e.g. the second tissue 175 as depicted by FIG. 1).

In some exemplary implementations of the system 100, the needle guide 102 is anchored to the second tissue 175 such that a first tissue 150 which is threaded by a needle at one or more cavities 214 is couplable to the second tissue by threading at least a portion of the needle through the second opening 204.

Figure 3A:
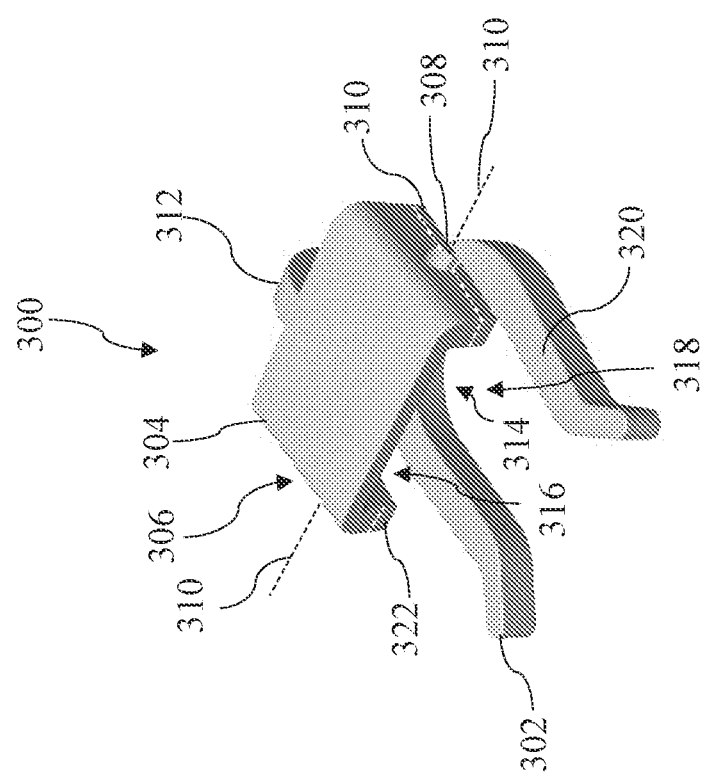
FIGS. 3A and 3B are a perspective view and sectional perspective view, respectively, of a needle guide configured in accordance with embodiments of the present technology.
Figure 3B:
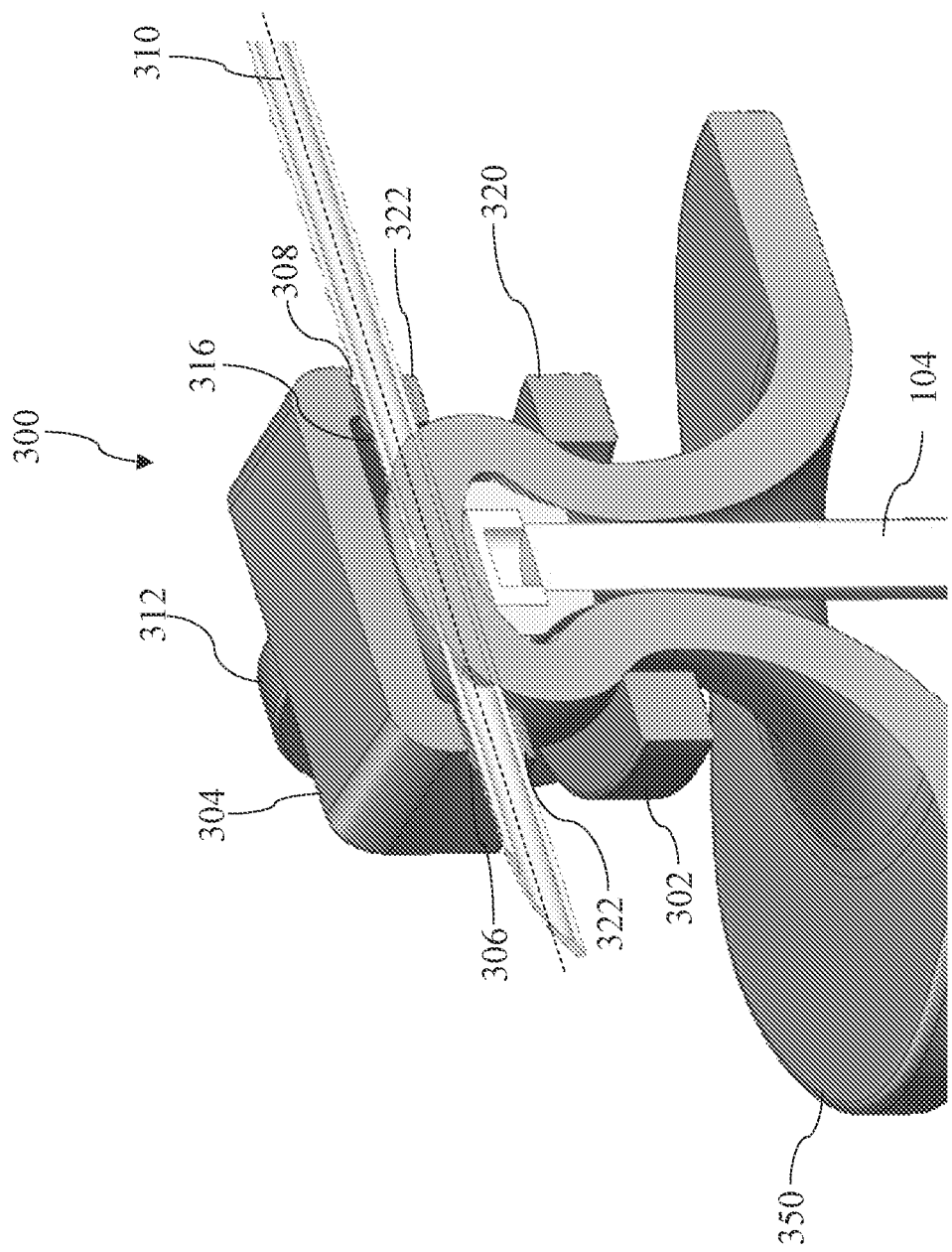

Reference is made to FIGS. 3A and 3B, which are perspective view and sectional perspective view simplified illustrations of a needle guide, in accordance with some embodiments of the present technology. In some embodiments, the needle guide 200 can be the same or substantially the same as the needle guide 102 of the system 100 (FIGS. 1A and 1B), and therefore may be referred to as "the needle guide 102", "the needle guide 300" or "the needle guide 102/300". In some embodiments, the needle guide 102/300 is configured to engage at least a portion of a tissue of a subject, and/or, to a tissue of a subject drawn over a tissue manipulator 104. In some embodiments, the needle guide 102/300 is configured to interlock with and/or couple to a portion of a tissue covering the tissue manipulator 104. In some embodiments, the needle guide 300 is a self-coupling needle guide 300 which, once coupled to a tissue covered tissue manipulator 104, independently maintains its spatial orientation in relation to the tissue manipulator 104.

For example, in some embodiments, the needle guide 102/300 couples to the tissue manipulator 104 such that the tissue covering the tissue manipulator 104 is stationary within a cavity 314 of the needle guide 102/300.

In some embodiments, the needle guide 102/300 is configured such that at a set position, in which the needle guide 102/300 is coupled to a tissue manipulator 104 covered by a tissue, the path of travel 310 of needle 106 crosses a same surface of the tissue a plurality of times. In some embodiments, the self-coupling needle guide 300 is configured to remain coupled to a portion of a tissue covering the tissue manipulator 104 such that the path of travel 310 is fixed in relation to the tissue and/or the tissue manipulator 104.

A potential advantage of the needle guide 102/300 being self-coupled to a portion of a tissue covering the tissue manipulator 104 is in that the needle guide 102/300 does not require a user to continuously hold and/or maintain the position of the path of travel 310 at a specific position in relation to the tissue and/or the tissue manipulator 104, freeing a hand of the user.

In some embodiments, cavity 214 as depicted by FIGS. 2, 3A, and 3B, is structurally and/or functionally similar to cavity 314 as described elsewhere herein.

In some embodiments, the self-coupling needle guide 300 comprises a clip 302 and a needle guide body 304. In some embodiments, the self-coupling needle guide 300 is handleless. In some embodiments, such as depicted by FIG. 3B, the clip 302 is configured to hold onto a portion of a tissue of a subject and/or a tissue manipulator 104.

In some embodiments, the needle guide body 304 comprises at least one of a first opening 306 and a second opening 308, which are configured to define the path of travel 310 of a needle 106 inserted into the self-coupling needle guide 300 through one or more of the first opening 306 and the second opening 308. In some embodiments, the needle guide body 304 comprises the cavity 314 configured to fit therein at least a portion of the tissue manipulator 104.

In some embodiments, the path of travel 310 is defined to transverse at least a portion of the cavity 314. In some embodiments, the first opening 306 and the second opening 308 are on opposing sides of the cavity 314.

In some embodiments, the cavity 314 is defined by an inner wall 316 positioned opposite to the cavity 314 opening 318. In some embodiments, the depth of the cavity 314, comprises the distance between the defined path of travel 310 and the inner wall 316. In some embodiments, the depth of the cavity 314 is configured to correlate with tissue thickness such that the path of travel 310 crosses a same surface of the tissue a plurality of times.

In some embodiments, the clip 302 is coupled and/or detachably coupled to the needle guide body 304. In some embodiments, the clip 302 is coupled and/or detachably coupled to the needle guide 304 through a neck 312. In some embodiments, the neck 312 is configured to couple between the clip 302 and the needle guide body 304.

In some embodiments, the clip 302 comprises one or more arms 320 configured to trap a tissue and/or a tissue manipulator 104 therebetween. In some embodiments, the one or more arms 320 are rigid or semi-rigid. In some embodiments, the one or more arms 320 are resilient. In some embodiments, the one or more arms 320 are coupled to one or more of the needle guide body 304 and/or the neck 312. In some embodiments, the one or more arms 320 are configured to direct a tissue manipulator 104 and/or tissue 350 of a subject towards the needle guide body 304.

In some embodiments, the self-coupling needle guide 300 comprises a band 322 configured to define a depth of the path of travel 310 in relation to the thickness of the tissue 350. In some embodiments, the band 322 is configured to define a path of travel 310 in relation to the tissue manipulator 104.

In some embodiments, the band 322 is integral with the needle guide 300/102. For example, in some embodiments, the band 322 is positioned adjacent to one or more of the openings 306/308. In some embodiments, the band 322 is configured to at least partially enclose around a portion of the tissue 350. In some embodiments, the band 322 is elastic or semi-rigid. In some embodiments, the band 322 is configured to abut the tissue manipulator 104 and/or portion of the tissue inserted into the cavity 314. Reference is made to FIGS. 4A, 4B, 4C, 4D, 4E, and 4F, which are perspective view and cross section view simplified illustrations of height variations of the path of travel corresponding to tissue thickness, in accordance with some embodiments of the present technology. FIGS. 4A, 4B, 4C, 4D, 4E, and 4F depict exemplary band 322/422 heights in relation to the tissue manipulator 104 and/or the thickness of the tissue 450-1/450-2/450-3 through which the path of travel 310 crosses.

In some embodiments, the size and/or the diameter of the band 322/422 is fixed and/or rigid. In some embodiments, the size and/or shape of the band 322/422 is configured such in accordance with the thickness of the tissue. For example, different tissues which have different ranges of thickness require specific sized bands 322/422.

In some embodiments, the position of the band 322/422 in relation to the tissue manipulator 104 correlates with the thickness of the tissue positioned between the band 322/422 and the tissue manipulator 104. In FIGS. 4A-4F, the tissues 450-1/450-2/450-3 each comprise different thicknesses, and thereby require that the band 322/422 would be positioned at different distances from the tissue manipulator 104.

Figure 4E:
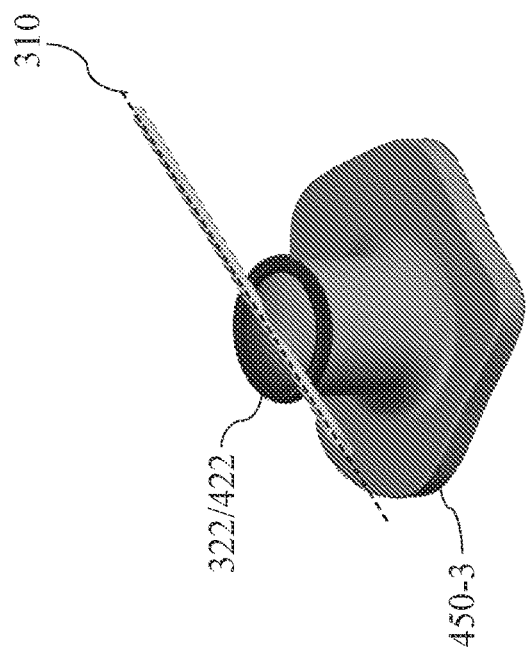
Figure 4F:
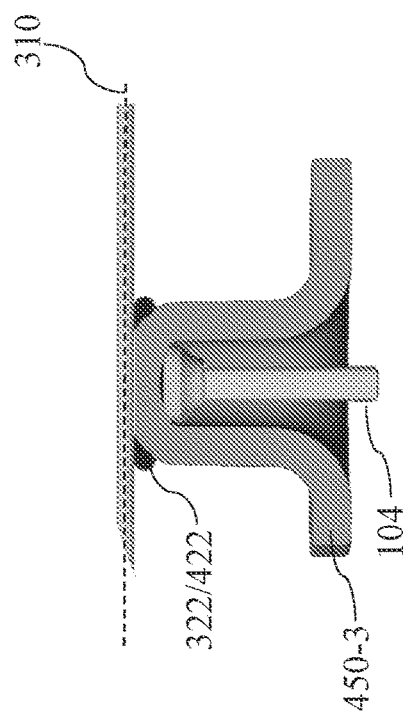

For example, FIGS. 4A and 4B depict an exemplary embodiment in which the path of travel 310 crosses the tissue 450-1 such that the path of travel 310 crosses a same surface of the tissue 450-1 a plurality of times. For example, FIGS. 4C and 4D depict an exemplary embodiment in which the path of travel 310 crosses more than one surface of the tissue 450-2. For example, FIGS. 4E and 4F depict an exemplary embodiment in which the path of travel 310 does not cross the surface of the tissue 450-3.

In some embodiments, the band 322/422 is sized in accordance with the thickness of the tissue such that positioning the band 322/422 at a fixed location in relation to the tissue manipulator 104 such that the path of travel 310 crosses a same surface of the tissue a plurality of times.

In some embodiments, the band 322/422 is sized in accordance with the thickness of the tissue such that positioning the band 322/422 at a fixed location in relation to the tissue manipulator 104 such that the path of travel 310 does not cross the tissue manipulator.

Tissue Manipulator(s)

Figure 5C:
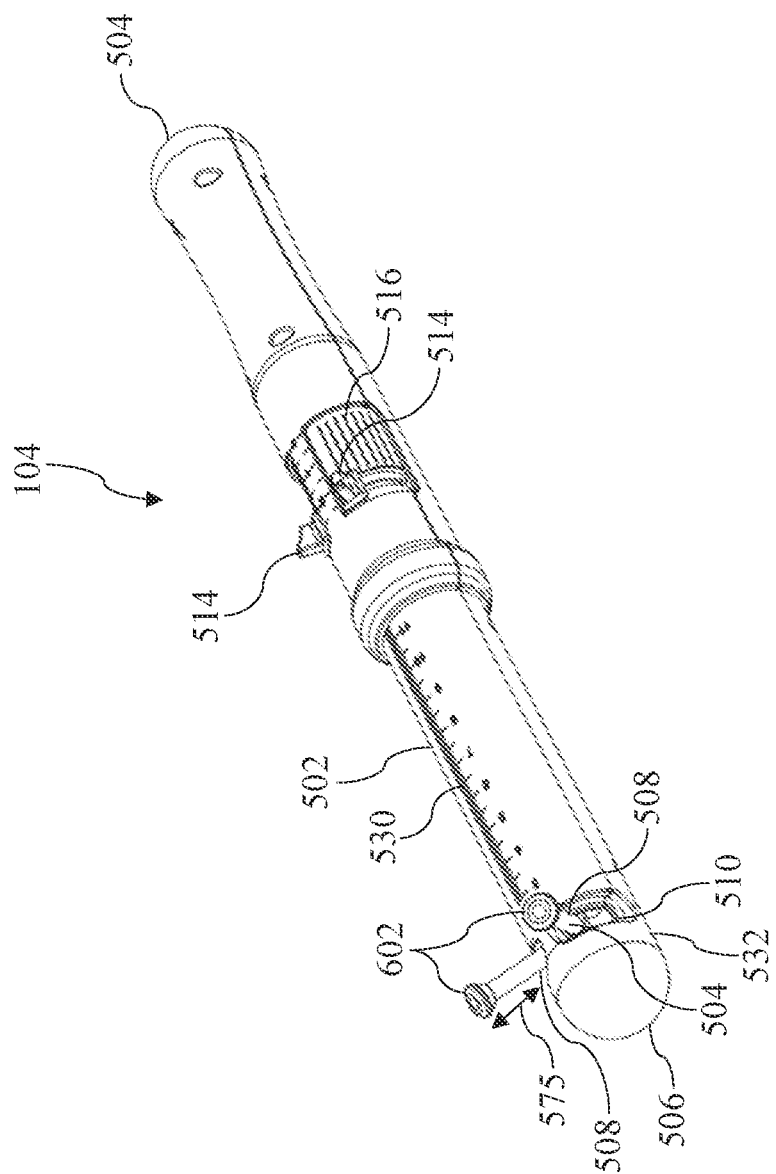

Reference is made to FIGS. 5A, 5B, and 5C, which are perspective view simplified illustrations of a tissue manipulator, in accordance with some embodiments of the present technology. In some embodiments, the tissue manipulator 104 comprises one or more probes 508 configured to manipulate a portion of tissue. In some embodiments, probes 508 are configured to manipulate a portion of tissue e.g., a wall of a hollow organ, from within an organ lumen e.g., within lumen of the rectum. In some embodiments, the one or more probes 508 are configured to adjust a position of a tissue extended or draped over the one or more probes 508 and/or tissue manipulator 104.

In some embodiments, the tissue manipulator 104 comprises a handle 504 configured to aid a user in manipulation of the spatial orientation of the probes 508 in relation to the needle guide 102. In some embodiments, the tissue manipulator 104 comprises a shell or shaft 502 extending from the handle 504. In some embodiments, and as described in greater detail elsewhere herein, the handle 504 comprises control levers 514 configured to control movement of the probes 508 in relation to the handle 504 and/or the shell 502.

In some embodiments, the spatial orientation of the one or more probes 508 in relation to the handle 504 and/or the shell 502 is adjustable. In some embodiments, the spatial orientation of the one or more probes 508 in relation to the shell is fixable.

In some embodiments, the shell 502 comprises a tube, a channel, or the like. In some embodiments, the shell 502 comprises a cylindrical shape. In some embodiments, the shell 502 comprises markings, such as a scale 530, positioned in relation to the handle 504. In some embodiments, the markings are configured to be a depth gauge which enables a surgeon to know the depth of insertion of the shell 502, for example, in an organ lumen.

In some embodiments, the shell 502 is configured to house at least a portion of the one or more probes 508. In some embodiments, at an at least partially extended state of the probes 508, the one or more probes 508 extend radially outward through the shell 502. In some embodiments, at a fully contracted state of the one or more probes 508, a probe head 602 is flush with the shell 502 surface.

In some embodiments, the shell 502 comprises eyelets 510 through which the probes are moveable in relation to the shell 502 and/or the shell 502 surface. In some embodiments, the eyelets 510 comprise a slot or a recess and are extended through a thickness of the shell 502. In some embodiments, the eyelets 510 are circular. In some embodiments, the eyelets 510 are elongated and extend circumferentially and radially along the shell 502. In some embodiments, the eyelets 510 extend along a longitudinal axis 550 of the shell 502. In some embodiments, the eyelets 510 extend perpendicular to the longitudinal axis 550 of the shell 502.

In some embodiments, the eyelets 510 are sized and positioned along the shell 502 as to limit the movement of the one or more probes 508. In some embodiments, the eyelets 510 are sized and positioned along the shell 502 such that the probes 508 are moveable in relation to the shell 502. In some embodiments, the eyelets 510 are positioned along a distal end 532 of the tissue manipulator 104, or in other words, near the end of the tissue manipulator 104 opposing the handle 504. In some embodiments, the eyelets 301 are positioned proximal to the shell tip 506.

In some embodiments, the shell 502 comprises a shell tip 506 at the distal end 532 of the tissue manipulator 104. In some embodiments, the shell tip 506 comprises a rounded portion for a safe insertion of the tissue manipulator 104 into a body cavity e.g., rectum or vagina. In some embodiments, the shell tip 506 is soft. In some embodiments, the shell tip 506 is flexible. In some embodiments, the shell tip 506 comprises one or more proximity sensor, optical sensor, and a pressure sensor for determining a location of the shell tip 506 within a tissue lumen of a subject.

In some embodiments, the handle 504 comprises one or more control levers 514 configured to control one or more of the position, location, orientation, and length of extension (L) of the one or more probes 508 in relation to the shell 502 and/or the handle 504. In some embodiments, each probe 508 is separately controlled by a corresponding one or more control levers 514.

In some embodiments, the probes 508 are maneuverable to a plurality of positions in relation to the shell 502. For example, in a closed position of a probe 508, such as depicted by FIG. 5B, a probe head 602 is leveled with the eyelet 510 and/or positioned inside the shell 502. For example, at an extended position, such as depicted by FIG. 5C, a probe 508 is extended from the eyelet 510 at a length of extension (L) depicted by arrow 575. In some embodiments, the length of extension (L) of the one or more probes are controlled by the one or more controller 514.

In some embodiments, the one or more control levers 514 comprise one or more of a button or a notch. In some embodiments, the control levers 514 are moveable within one or more tracks 516 positioned along the handle 504. In some embodiments, the control levers 514 are configured to be manipulated by a user within the one or more tracks 516. In some embodiments, the control levers 514 are slidable within the one or more tracks 516. In some embodiments, the tracks 516 comprise a slot along the handle 504 wherein the one or more control levers area slidable within the tracks 516.

In some embodiments, one or more of the dimensions of the tracks 516 correspond with one or more dimensions of the eyelets 510. For example, in some embodiments, the length of the eyelet 510 along a radius of the shell 502 is equal to the length of the tracks along a radius of the handle 504.

For example, in the tissue manipulator 104 depicted by FIGS. 5B and 5C, the position of the control levers 514 control lever 514 in relation to the handle 504 determines the length of extension of each probe head 602 in relation to the shell 502 and/or eyelet 510. In some embodiments, the distance which the control lever 514 slides and/or rotates in relation to the shell 502 corresponds to the length of extension (L) of the one or more probes 508 and/or an angle of the probe head 602 in relation to the eyelet 510. In some embodiments, the length of extension (L) of each probe 508 is controlled separately by the one or more control lever 514.

In some embodiments, the angle of the probe head 602 in relation to the eyelet 510 is controlled separately by the one or more control lever 514. In some embodiments, the one or more control levers 514 are coupled to the one or more probe 508. In some embodiments, the one or more control levers 514 are coupled to the one or more probe 508 electronically. In some embodiments, the one or more probes 508 extend within the shell 502, from the eyelets 510 towards the handle 504 and are coupled to the control levers 514 such that the control levers 514 manipulates one or more of the length, an articulation angle, spatial orientation of the probe 508 and spatial orientation of the probe head 602 by positioning the control levers 514 at along the tracks 516.

In some embodiments, the shell 502 comprise one or more magnet around one or more eyelets 510. In some embodiments, the magnet is configured to attract to a portion of the needle guide 102. For example, in some embodiments, the needle guide 102 comprises a magnet. For example, in some embodiments, needle guide 102 comprises a magnetic portion configured to attract the one or more magnet of the shell 502 such that a tissue positioned between the probe 508 and needle guide 102 is tautly positioned along the path of travel 135.

Probes

Reference is made to FIGS. 6A and 6B, which are a perspective view and a cross-section view simplified illustrations of a probe, in accordance with some embodiments of the present technology. In some embodiments, the one or more probes 508 comprise a stem 504 and a probe head 602. In some embodiments, the stem 504 extends within the shell 502 and from one of the one or more eyelets 510. In some embodiments, the probe head 602 is positioned at the distal end 622 of the probe 508.

In some embodiments, the width of the probe head 602 is larger than the width of the stem 504. In some embodiments, the probe head 602 is configured to approximate tissue and a needle guide 102 and/or one or more cavity 214 of a needle guide 102. In some embodiments, the probe head 602 is configured to insert within the one or more cavity 214. In some embodiments, the probe head 602 is configured to support an extended layer of tissue.

In some embodiments, the stem 504 comprises a rod-shaped member. In some embodiments, the spatial orientation of the stem 504 is adjustable. in some embodiments, the spatial orientation of the stem 504 is adjustable via the control levers 514. In some embodiments, the spatial orientation of the probe head 602 is adjustable via adjustments of the stem 504.

In some embodiments, the stem 504 is rotatable about the longitudinal axis of the stem 504. In some embodiments, the stem 504 is extendable. In some embodiments, the adjustment, rotation, and/or extension of the stem 504 is controllable by the one or more controllers 514.

In some embodiments, the stem 504 comprises one or more articulations 606. In some embodiments, the articulation 606 is adjustable. In some embodiments, one or more angles of the articulation 606 is adjustable via the control levers 514. In some embodiments, the articulation 606 comprises a free range of movement. In some embodiments, the articulation 606 comprises two to four degree of freedom.

In some embodiments, the stem 504 comprises a plurality of articulations 606 such that the probe head 602 comprises up to six degrees of freedom. In some embodiments, the angle of the articulation 606 corresponds to the length of the distance between the probe head 602 and the shell 502.

In some embodiments, the position of the articulation 606 along the stem 504 is leveled with the shell 502 surface. In some embodiments, the position of the articulation 606 along the stem 504 extends outside of the shell 502. In some embodiments, the position of the articulation 606 is adjustable in relation to the shell 502.

In some embodiments, the articulation 606 is positioned along the stem 504 between a first portion 610 and a second portion 612 of the stem 504. In some embodiments, the angle of the articulation 606, or in other words, the angle between the first portion 610 and the second portion 612, is adjustable. In some embodiments, once adjusted, the angle of the articulation 606 is fixable such that the position of the first portion 610 is fixed in relation to the second portion 612.

In some embodiments, one or more probe heads 602 comprises a tissue manipulating surface 650 having a geometry complementary with inner wall 112/206 of needle guide 102. For example, in some embodiments, the tissue manipulating surface 650 is one or more of generally flat, concave, and/or convex. In some embodiments, edges of tissue manipulating surface 650 are rounded so that to avoid tearing of tissue urged against inner wall 112/206 and trapped between probes 508 tissue manipulating surface 650 and inner wall 112/206 of needle guide 102.

A potential advantage in at least a portion of probes 508 tissue manipulating surface 650 being flat is in that a flat surface is configured to stretch the tissue and "iron out" wrinkles when urging a portion of tissue e.g., first tissue 150 against inner wall 112/206 and prevent a needle traveling along path of travel 135 to traverse a full thickness of the tissue as explained in greater detail elsewhere herein and in some configurations, enable breaching of an integrity of a lumen of a hollow organ.

In some embodiments, the probe head 602 comprises a geometry complementary to the needle guide body 202 and/or the inner wall 112/206 of the needle guide 102. In some embodiments, a portion of the head 602 is rigid, semi-rigid, or flexible. In some embodiments, the probe head 602 comprises a geometry which is insertable and/or fixable within the cavity 214 of the needle guide 102.

In some embodiments, the probe 508 and/or the probe head 602 comprises one or more light-emitting element 614. For example, in some embodiments, such as depicted by FIGS. 6A and 6B, the probe head 602 comprises one or more LED circuit 618. In some embodiments, the probe head 602 comprises a LED diffuser 616 for diffusing light emitted by the LED emitting element 614.

A potential advantage of the probe head 602 comprising one or more light-emitting element 614 is in that the orientation of the tissue manipulator 104, the shell 502, and/or the one or more probes 508 are visually monitorable from outside of the tissue lumen.

A potential advantage of the orientation of the tissue manipulator 104, the shell 502, and/or the one or more probes 508 being visually monitorable from outside of the tissue lumen is in that the tissue manipulator 104 and/or at least a portion of the tissue manipulator 104 can be adjusted to at a specific and/or desired position in relation to the tissue lumen and/or other tissues of the subject while the tissue manipulator 104 is located within the tissue lumen.

In some embodiments, the one or more probes 508 comprise a magnet 620. In some embodiments, the magnet 620 is positioned along the probe head 602. In some embodiments, the magnet is configured to attract to a portion of the needle guide 102. For example, in some embodiments, the needle guide 102 comprises a magnet. For example, in some embodiments, the inner wall 112/206 of the needle guide 102 comprises a magnetic portion 230 configured to attract the magnet 620 of the probe 508. In some embodiments, the magnetic portion 230 of the needle guide 102 is positioned in relation to the path of travel 135 such that a tissue positioned between the magnet 620 and the magnetic portion 230 is positioned along the path of travel 135.

A potential advantage of the probe 508 comprising a magnet 620 which attracts to a portion of the needle guide 102 is in that attraction of the magnets of the probe 508 and the needle guide 102 position the probe 508 at a predetermined position in relation to the path of travel 135.

A potential advantage of the probe 508 comprising a magnet 620 which attracts to a portion of the needle guide 102 is in that attraction of the magnets of the probe 508 and the needle guide 102 automatically positions the probe 508 such that a tissue trapped between the magnets is positioned along the path of travel 135.

A potential advantage of the probe 508 comprising a magnet 620 which attracts to a portion of the needle guide 102 is in that attraction of the magnets of the probe 508 and the needle guide 102 urges a portion of tissue e.g., first tissue 150 against inner wall 112/206 trapping and flattening out the portion of tissue without assistance from the system operator.

In some embodiments, the magnets are positioned along the probe 508 and/or the needle guide 102 such that the path of travel 135 is uninterrupted by the magnets. For example, in some embodiments, the magnets are positioned at either side of the path of travel 135.

Methods

Figure 7:
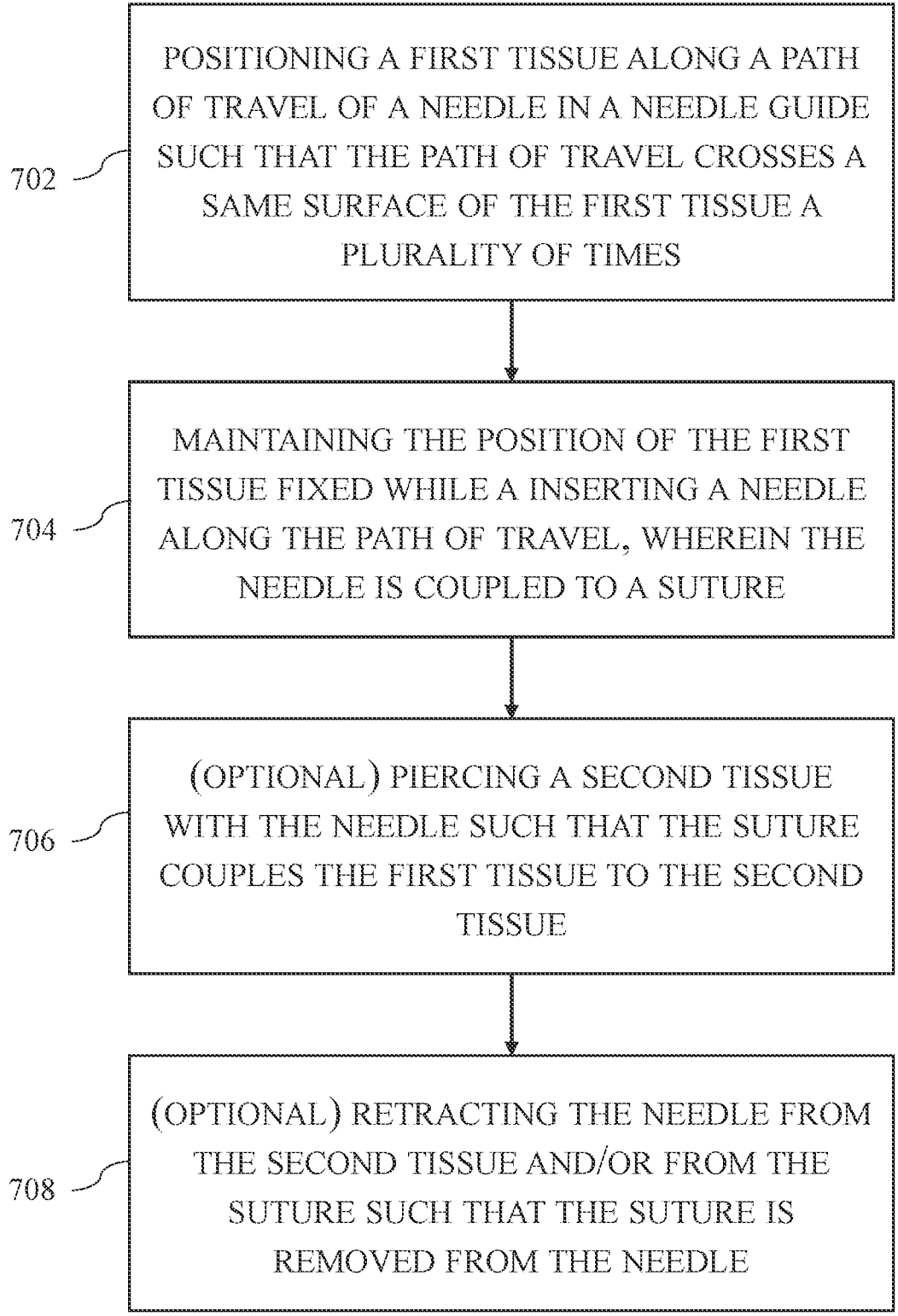
FIG. 7 is a flow chart of a method for threading a tissue in accordance with embodiments of the present technology.

The present technology further includes methods of performing medical procedures using the tissue-pexy systems and devices described herein. For example, FIG. 7 is a flow chart of a method for threading a tissue, in accordance with some embodiments of the present technology. In some embodiments, at step 702, the method comprises positioning a first tissue along a path of travel of a needle in a needle guide such that the path of travel crosses a same surface of the first tissue a plurality of times. This may include, for example, (a) positioning a needle guide adjacent to an outer surface of the first tissue, and (b) positioning a tissue manipulator adjacent an inner surface of the first tissue. Once the needle guide and the manipulator are positioned, a probe can be deployed from the tissue manipulator to position at least a portion of the first tissue within a cavity of the needle guide, the cavity being in-line with the path of travel of the needle, as previously described herein.

In some embodiments, at step 704, the method comprises maintaining the position of the first tissue fixed while inserting a needle through the needle guide along the path of travel, wherein the needle is coupled to a suture. Optionally, at step 706, the method comprises piercing a second tissue with the needle such that the suture couples the first tissue to the second tissue. Optionally, at step 708, the method comprises retracting the needle from the second tissue and/or from the suture such that the suture is removed from the needle.

In some embodiments, the method comprises positioning a needle guide at a first side of the first tissue. In some embodiments, the method comprises positioning a tissue manipulator at a second side of the same first tissue. In some embodiments, the method comprises approximating the tissue manipulator to the needle guide and positioning at least a portion of the first tissue in a path of travel of a needle traveling through the needle guide and inserting a needle into the needle guide, such that the needle is traversing the first tissue a plurality of times without crossing into the second side of the first tissue. The method comprises inserting a needle into the needle guide, traversing the first tissue, and exiting the needle guide and inserting the needle into a second tissue.

In some embodiments, a suture is coupled to an anchor driven or carried by the needle 106 such that the suture is carried by the needle through one or more tissues and is detached from the needle guide 102 once the anchor is embedded in a tissue and needle 106 retracts from the one or more tissues. In some embodiments, the needle guide 102 comprises a slot 116 disposed at least between the cavity 214 and an opening 204 at a tip of the needle guide 102. In some embodiments, the method comprises sliding the suture through the slot 116 of the needle guide 102. In some embodiments, the slot 116 allows the suture to disconnect from the needle guide 102 after the needle has penetrated through one or more tissues.

Figure 8A:
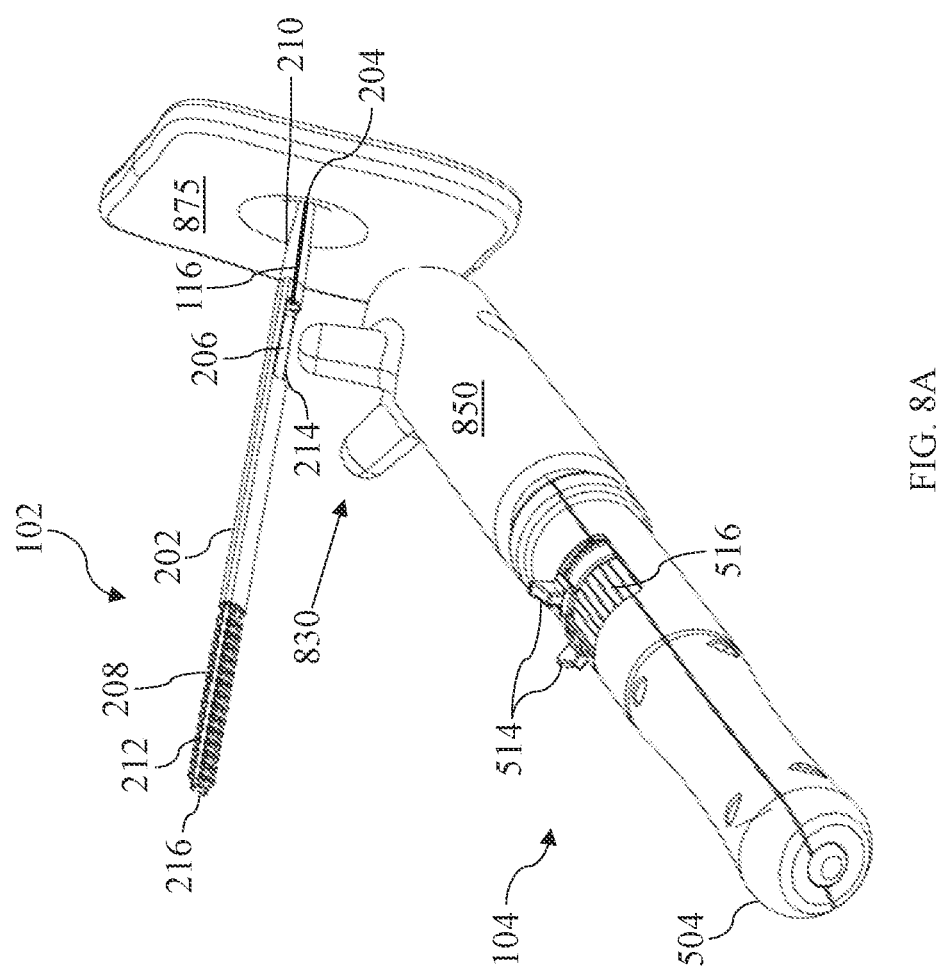
FIGS. 8A, 8B, and 8C are perspective views of a tissue-pexy system configured in accordance with another embodiment of the present technology.
Figure 8B:
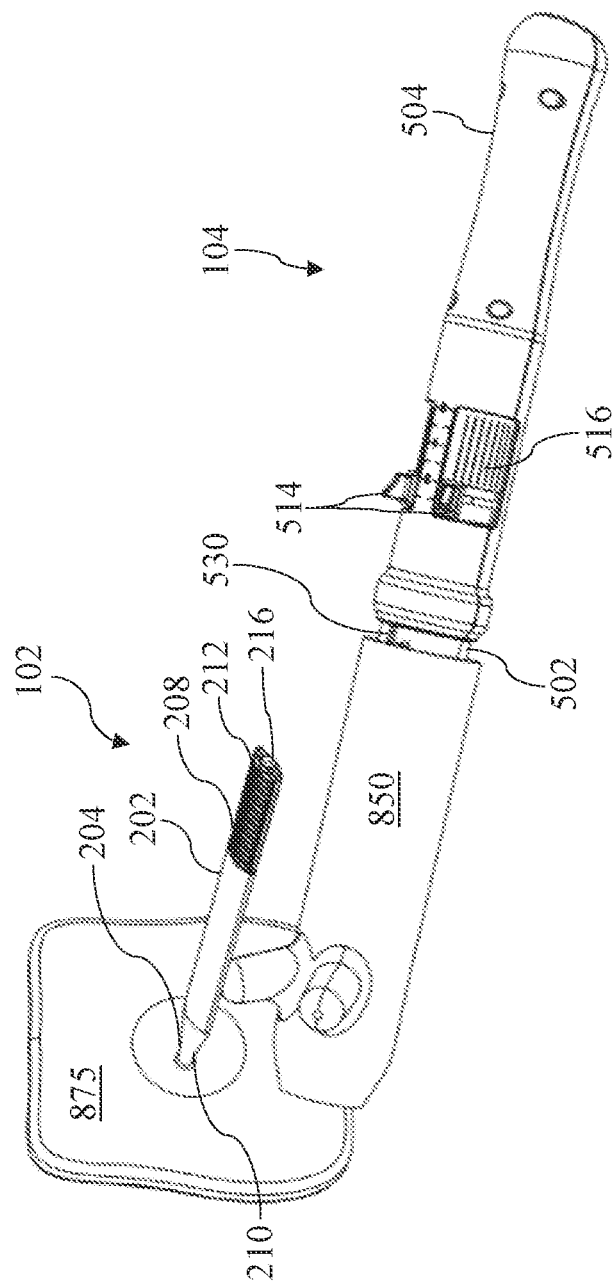
Figure 8C:
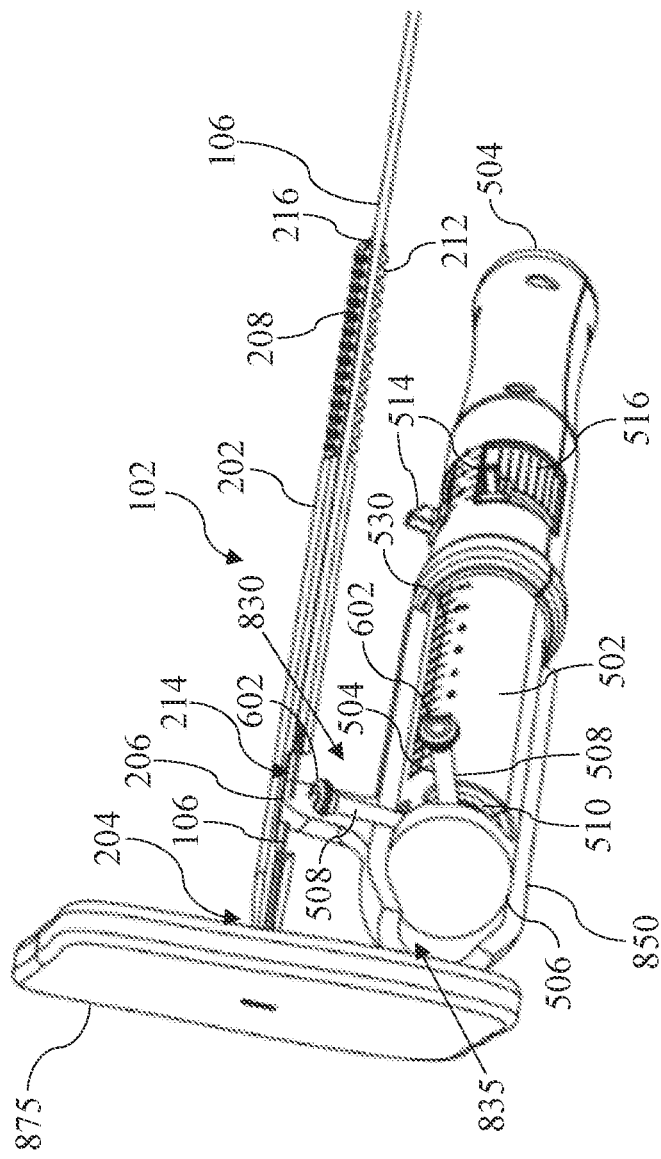

Reference is made to FIGS. 8A, 8B, and 8C, which are perspective view simplified illustrations of a system, in accordance with some embodiments of the present technology. In some embodiments, FIGS. 8A, 8B, and 8C depict implementation of system 100 in correspondence with the steps of the method depicted in FIG. 7, and in accordance with some embodiments of the present technology.

Figure 9A:
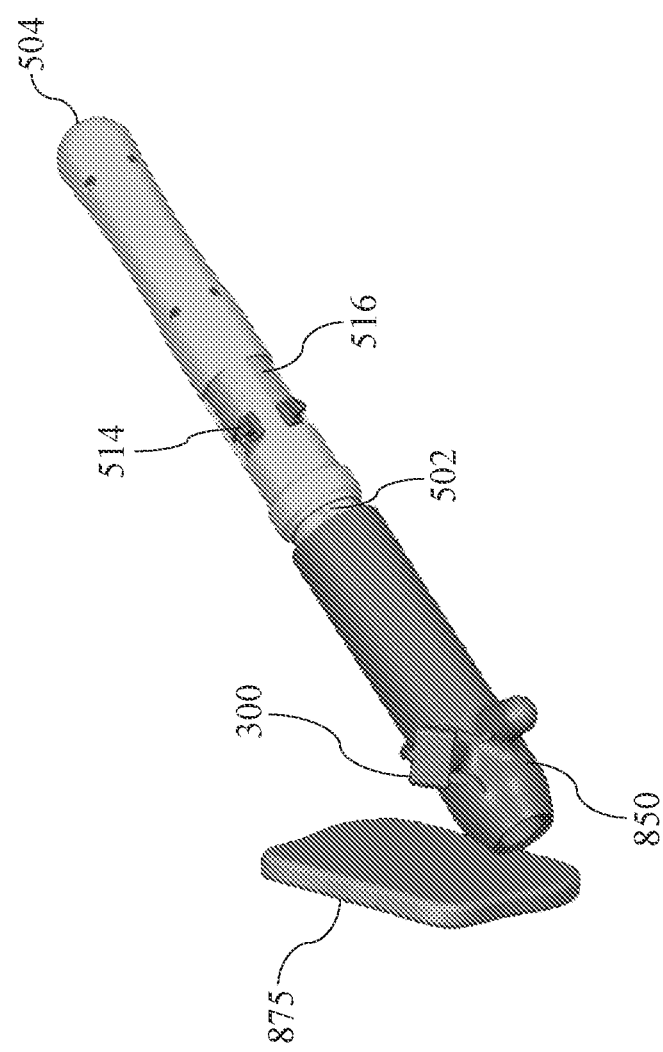
FIGS. 9A and 9B are perspective views of a tissue-pexy system configured in accordance with further embodiments of the present technology.
Figure 9B:
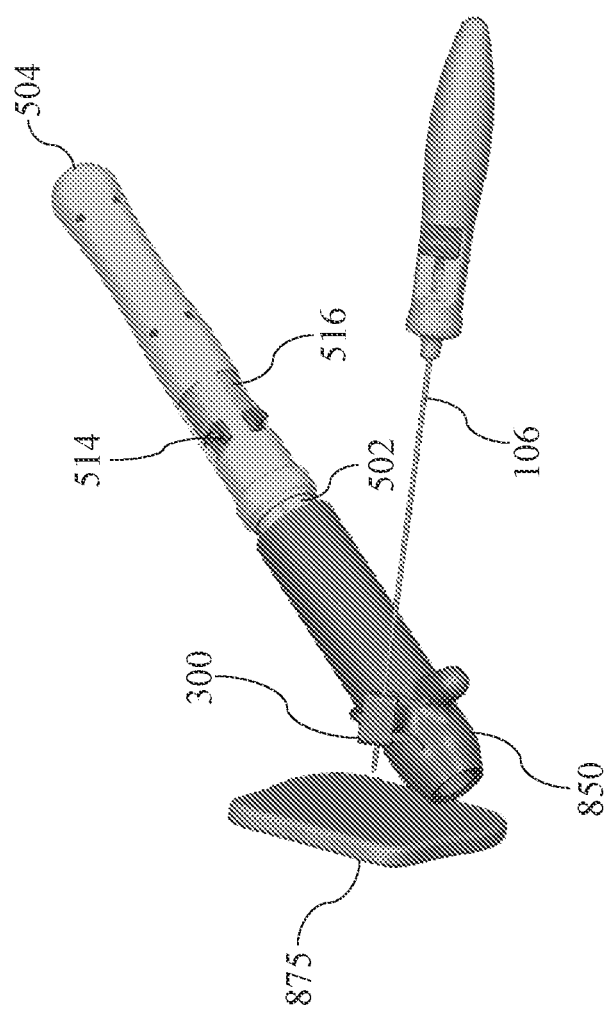

Reference is made to FIGS. 9A and 9B, which are perspective view simplified illustrations of a tissue-pexy system, in accordance with some embodiments of the present technology. In some embodiments, FIGS. 9A and 9B depict implementation of system 100 in correspondence with the steps of the method depicted in FIG. 7, and in accordance with some embodiments of the present technology.

In some embodiments, the method comprises positioning the needle guide 102/300 along a first side 830 of a first tissue 850/150 such that one or more cavity 214 faces the first tissue 850/150.

In some embodiments, the method comprises coupling the needle guide 102 to the second tissue 875/175. In some embodiments, for example, the second tissue 875/175 is a ligament, such as, the supraspinous ligament. In some embodiments, the method comprises anchoring the second opening 204 of the needle guide 102/300 to the second tissue 875/175.

In some embodiments, the method comprises positioning the tissue manipulator 104 along a second side 835 of the first tissue 850/150 and adjusting the one or more probes 508 via the one or more control levers 514.

In some embodiments, the method comprises setting the needle guide 300/102 onto the tissue manipulator 104 such that at least a portion of the tissue 850 is positioned between the needle guide 300/102. In some embodiments, the method comprises setting the needle guide 300/102 onto the tissue-covered tissue manipulator 104 such that the needle guide is independently maintained positioned on the tissue covering the tissue manipulator 104. In some embodiments, the method comprises setting the needle guide 300/102 onto the tissue-covered tissue manipulator 104 such that the spatial orientation of the needle guide 300/102 is independently maintained fixed in relation to the tissue manipulator 104.

In some embodiments, the method comprises extending one or more probes 508 of the tissue manipulator 104. In some embodiments, the method comprises rotating the one or more probes in relation to the handle 504. In some embodiments, the method comprises adjusting the angle of the articulation 606 of one or more probe 508 head 602 such that the head 602 is aligned with a cavity 214 of the needle guide 102/300.

In some embodiments, the method comprises extending the head 602 from the shell 502 and/or from the eyelet 510. In some embodiments, the method comprises extending the head 602 such that the head 602 is aligned with a cavity 214 of the needle guide 102/300.

In some embodiments, the method comprises switching the light emitting element 614 on. In some embodiments, the method comprises visually locating the light emitting element 614, which is positioned on the second side 835 of the first tissue 850/150, by observing the light that reaches the second side 835 of the first tissue 850/150. In some embodiments, the light emitted by the light emitting element 614 is visible through at least the first tissue 850/150.

In some embodiments, the method comprises aligning the head 602 of the probe with the needle guide 102/300 and/or the cavity 214 using the light emitting element 614 to locate the head 602. In some embodiments, the method comprises positioning the needle guide 102/300 such that the cavity 214 is aligned with the head 602 of the one or more probes 508.

In some embodiments, the method comprises approximating the magnet 620 to the magnetic portion 230 such that the probe 508 is automatically aligned with the cavity 214. In some embodiments, the method comprises approximating the magnet 620 to the magnetic portion 230 such that the probe 508 is automatically deployed into the cavity 214. In some embodiments, the method comprises approximating the magnet 620 to the magnetic portion 230 such that the probe 508 is automatically extended towards the cavity 214.

In some embodiments, the method comprises inserting a needle 106 along the path of travel 135 and threading the needle 106 through the first tissue 850/150.

In some embodiments, the method comprises threading the needle 106 through the first tissue 850/150 without entering the tissue 850/150 lumen. In some embodiments, the method comprises threading the needle 106 through the first tissue 850/150 by piercing the surface of the first tissue 850/150 proximal to the needle guide 102 a plurality of times. In some embodiments, the method comprises threading the needle 106 through the first tissue 850/150 without crossing the surface of the tissue 850/150 that is proximal to the tissue manipulator 104.

EXAMPLES

Several aspects of the present technology are set forth in the following examples:

1. A tissue-pexy system, comprising:
a needle guide having an elongated structure extending between a first end portion and a second end portion, the elongated structure having—
   a cavity between the first end portion and the second end portion, wherein the cavity is configured to receive a portion of tissue, and
   a lumen configured to receive a needle, wherein the lumen includes a first lumen portion extending between the first end portion and the cavity and a second lumen portion extending between the second end portion and the cavity; and
a tissue manipulator having one or more deployable probes configured to direct the portion of tissue into the cavity,
   wherein the system is configured such that, when the one or more deployable probes directs the portion of tissue into the cavity and a needle is advanced through the lumen, the needle traverses the cavity and pierces the portion of tissue as it moves from the first lumen portion to the second lumen portion.

2. The system of example 1, wherein the portion of tissue has an outer surface and an inner surface, wherein the system is configured to pierce the outer surface in at least two locations without piercing the inner surface.

3. The system of example 1 or 2, wherein the cavity has an inner surface, a first lateral surface, and a second lateral surface, and wherein—
   the first lateral surface has a first opening in fluid communication with the first lumen portion, and
   the second lateral surface has a second opening in fluid communication with the second lumen portion,
   wherein the first opening and the second opening are configured to receive the needle as it is advanced through the lumen from the first lumen portion to the second lumen portion.

4. The system of example 3 wherein the system is configured such that the needle penetrates the portion of tissue between the probe and the inner surface of the cavity as it advances from the first opening to the second opening.

5. The system of any of examples 1-4, wherein a geometry of the probe is complementary to a geometry of the cavity.

6. The system of any of examples 1-4, wherein the probe is transitionable between a low-profile delivery configuration and a deployed configuration.

7. A system, comprising:
a needle guide defining a path of travel of a needle inserted through said guide; and
a tissue manipulator configured to approximate tissue and said needle guide and to position at least a portion of said tissue in said path of travel of said needle; and
wherein said tissue manipulator and said needle guide are alignable such that said path of travel crosses a same surface of said tissue a plurality of times.

8. The system of example 7, wherein said needle guide comprises a cavity configured to accommodate at least a portion of said tissue manipulator.

9. The system of example 8, wherein said path of travel is exposed by said cavity.

10. The system of any of examples 7-9, wherein said tissue manipulator comprises at least one probe.

11. The system of example 10, wherein said probe comprises a light-emitting element.

12. The system of any of examples 7-11, wherein said tissue manipulator comprises a shell and at least one probe extending radially outwards from said shell.

13. The system of any of examples 7-12, wherein said tissue manipulator comprises a handle and wherein one of the length of extension, the position, and spatial orientation of said probe is adjustable in relation to said handle.

14. The system of any of examples 7-13, wherein geometries of at least a portion of said guide and at least a portion of said tissue manipulator are complementarily.

15. The system of any of examples 7-14, wherein at least a portion of said tissue manipulator is flexible.

16. The system of any of examples 7-15, wherein said tissue manipulator comprises at least one light-emitting diode.

17. The system of any of examples 7-16, wherein said tissue manipulator comprises a first magnet and said needle guide comprises a second magnet.

18. The system of any of examples 7-17, wherein said needle guide comprises a second opening configured to direct an exit path of a needle out of said needle guide.

19. The system of example 18, wherein said second opening of said needle guide is configured to couple to a tissue of a subject.

20. The system of example 18 or 19, wherein said needle guide comprises a slot between said cavity lumen and the second opening and spanning a full thickness of the guide wall.

21. The system of any of examples 7-20, wherein said needle guide is a self-coupling needle guide.

22. The system of any of examples 7-21, wherein said needle guide comprises a clip such that a spatial orientation of said needle guide is independently maintained fixed in relation to said tissue manipulator such that said path of travel crosses a same surface of said tissue a plurality of times.

23. A method for performing rectopexy comprising:
performing a rectal examination and identifying a site of excessive/abnormal rectal mobility;
identifying approximation of the identified site of excessive/abnormal rectal mobility of the rectum and/or para-rectal tissues to the sacrospinous ligament;
introducing an anchor and a suture intra-abdominally and extra-rectally and passing the anchor and suture through at least a portion of the exterior rectal wall; followed by guiding the anchor and suture into the sacrospinous ligament; and
anchoring the anchor and suture at least partially in the sacrospinous ligament.

24. A method for threading a tissue, comprising:
positioning a needle guide at a first side of a first tissue;
positioning a tissue manipulator at a second side of said same first tissue;
approximating the tissue manipulator to the needle guide;
positioning at least a portion of said first tissue in a path of travel of a needle traveling through the needle guide; and
inserting a needle into the needle guide, such that said needle is traversing the first tissue a plurality of times without crossing into said second side of said first tissue.

25. The method of example 24, comprising trapping said tissue between said needle guide and said tissue manipulator.

26. The method of example 24 or 25, comprising piercing said tissue such that a surface of the tissue proximal to said tissue manipulator is maintained intact.

27. The method of any of examples 24-26, wherein said tissue manipulator and said needle guide magnetically attract.

28. A method for coupling a first tissue to a second tissue, comprising:
positioning a first tissue at a position along a path of travel of a needle in a needle guide such that said path of travel crosses a same surface of said first tissue a plurality of times;
maintaining said position of the first tissue fixed while a inserting a needle along said path of travel, wherein said needle is coupled to a suture; and
piercing a second tissue with said needle such that said suture couples said first tissue to said second tissue.

29. The method of example 28, comprising retracting the needle from the second tissue and/or from the suture such that the suture is removed from the needle.

30. The method of example 28 or 29, comprising positioning said first tissue using a tissue manipulator configured to approximate said first tissue and said needle guide and to position at least a portion of said tissue in said path of travel of said needle.

31. An apparatus comprising:
a shell shaped to define a blunt distal end and configured to be advanced distally into a lumen of a subject through an orifice of the subject;
a needle guide configured to be advanced distally towards a target tissue of the subject, and shaped to define a side-facing cavity, the apparatus being configured to facilitate drawing of at least a portion of a wall of the lumen through the cavity and into the needle guide, when the cavity is facing the shell;
a suture deployment element shaped to define a piercing tip and configured to be distally advanced in the needle guide and to:
pierce the portion of the lumen wall while the portion is in the guide member;
at least partially pierce the target tissue; and
pass a suture through the piercing tip to penetrate the suture within the target tissue to secure the portion of the lumen wall to the target tissue.

32. The apparatus of example 31, wherein the lumen of the subject includes a rectum of the subject, the orifice includes an anus, and the target tissue includes a sacrospinous ligament, and wherein:
the shell is configured to be advanced distally into the rectum through the anus;
the needle guide is configured to be advanced distally towards the sacrospinous ligament; and
the suture deployment element is configured to:
pierce the portion of the tissue of the rectum wall while the portion is in the guide member;
at least partially pierce the sacrospinous ligament; and
pass the suture through the piercing tip to deploy at least a portion of the suture within the sacrospinous ligament to secure the rectum wall to the sacrospinous ligament.

33. The apparatus of example 30 or 31, wherein the longitudinal shell is further shaped to define one or more probes projecting from an external surface of the shell such that a portion of the lumen wall is projected by the projection, and wherein the projected portion is the portion drawn into the cavity.

34. The apparatus of example 33, wherein (a) the probe and the cavity each comprises a respective magnetic element, the magnetic elements being configured to draw the portion of the wall lumen into the cavity.

35. The apparatus of example 33 or 34, wherein the shell comprises a user-controllable slide-bar or knob being coupled to the probe such that distal advancement of the slide-bar or rotation of the knob produces projection of the probe through the external surface of the shell.

36. The apparatus of any of examples 31-35, wherein the cavity comprises a suction port and wherein the apparatus is configured to facilitate drawing of the lumen wall into the cavity by application of suction through the suction port.

37. The apparatus of example 36, further comprising the suction source.

38. The apparatus of any of examples 31-35, further comprising a reporting sensor configured to generate a reporting signal when the portion of the lumen wall is drawn into the needle guide cavity.

39. The apparatus of example 38, wherein the reporting sensor comprises an illumination source.

40. The apparatus of any of examples 31-35, further comprising the suture.

41. The apparatus of any of examples 31-35, wherein the piercing tip is configured to pierce the wall of the lumen without passing through the lumen.

42. The apparatus of any of examples 31-35, wherein the apparatus is configured to be proximally retracted following deployment of the portion of the suture.

43. The apparatus of any of examples 31-35, wherein the shell comprises a user-controllable slide-bar at a proximal portion of the shell, configured to control distal advancement of the shell through the lumen.

44. The apparatus of any of examples 31-35, wherein the needle guide is shaped to define a needle guide wall at least part of which is transparent.

45. The apparatus of any of examples 31-35, wherein at least part of the blunt distal end of the shell is dome-shaped.

CONCLUSION

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, any of the features of the intraocular shunts described herein may be combined with any of the features of the other intraocular shunts described herein and vice versa. Moreover, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions associated with intraocular shunts have not been shown or described in detail to avoid unnecessarily obscuring the description of the embodiments of the technology. Where the context permits, singular or plural terms may also include the plural or singular term, respectively.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A tissue-pexy system, comprising:
a needle guide having an elongated structure extending between a first end portion and a second end portion, the elongated structure having—
a cavity between the first end portion and the second end portion, wherein the cavity is configured to receive a portion of tissue, and
a lumen configured to receive a needle, wherein the lumen includes a first lumen portion extending between the first end portion and the cavity and a second lumen portion extending between the second end portion and the cavity; and
a tissue manipulator having a body and one or more deployable probes configured to be moved relative to the body between a first retracted position and a second deployed position, wherein the one or more deployable probes are configured to direct the portion of tissue into the cavity in the second deployed position,
wherein the system is configured such that, when the one or more deployable probes directs the portion of tissue into the cavity and a needle is advanced through the lumen, the needle is configured to traverse the cavity and pierce the portion of tissue as it moves from the first lumen portion to the second lumen portion.

2. The system of claim 1, wherein the portion of tissue has an outer surface and an inner surface, wherein the system is configured to pierce the outer surface in at least two locations without piercing the inner surface.

3. The system of claim 1, wherein the cavity has an inner surface, a first lateral surface, and a second lateral surface, and wherein—
the first lateral surface has a first opening in fluid communication with the first lumen portion, and
the second lateral surface has a second opening in fluid communication with the second lumen portion,
wherein the first opening and the second opening are configured to receive the needle as it is advanced through the lumen from the first lumen portion to the second lumen portion.

4. The system of claim 3, wherein the system is configured such that the needle penetrates the portion of tissue between the probe and the inner surface of the cavity as it advances from the first opening to the second opening.

5. The system of claim 1, wherein a geometry of the probe is complementary to a geometry of the cavity.

6. A system, comprising:
a needle guide having:
an elongated structure extending between a first end portion and a second end portion,
a cavity between said first end portion and said second end portion, and
a lumen configured to receive a needle, wherein said lumen includes a first lumen portion extending between said first end portion and said cavity and a second lumen portion extending between said second end portion and said cavity, and wherein said needle guide defines a path of travel of said needle inserted through said guide; and a tissue manipulator having a body and configured to approximate tissue and said needle guide and to position at least a portion of said tissue in said path of travel of said needle via at least one deployable probe configured to be moved relative to said body between a first retracted position and a second deployed position; and wherein said tissue manipulator and said needle guide are alignable such that said path of travel is configured to cross a same surface of said tissue a plurality of times.

7. The system of claim 6, wherein said path of travel is exposed by said cavity.

8. The system of claim 6, wherein said deployable probe comprises a light-emitting element.

9. The system of claim 6, wherein said tissue manipulator comprises a shell and said at least one deployable probe extends radially outwards from said shell.

10. The system of claim 6, wherein said tissue manipulator comprises a handle and wherein one of the length of extension, the position, and spatial orientation of said at least one deployable probe is adjustable in relation to said handle.

11. The system of claim 6, wherein geometries of at least a portion of said guide and at least a portion of said tissue manipulator are complementarily.

12. The system of claim 6, wherein at least a portion of said tissue manipulator is flexible.

13. The system of claim 6, wherein said tissue manipulator comprises at least one light-emitting diode.

14. The system of claim 6, wherein said tissue manipulator comprises a first magnet and said needle guide comprises a second magnet.

15. The system of claim 6, wherein said needle guide comprises a second opening configured to direct an exit path of a needle out of said needle guide.

16. The system of claim 15, wherein said second opening of said needle guide is configured to couple to a tissue of a subject.

17. The system of claim 6, wherein said needle guide is a self-coupling needle guide.

18. The system of claim 6, wherein said needle guide comprises a clip such that a spatial orientation of said needle guide is independently maintained fixed in relation to said tissue manipulator such that said path of travel crosses a same surface of said tissue a plurality of times.

* * * * *